United States Patent
Yamada et al.

(10) Patent No.: US 9,805,701 B2
(45) Date of Patent: Oct. 31, 2017

(54) PARAMETER CONTROLLER AND METHOD FOR CONTROLLING PARAMETER

(71) Applicant: Yamaha Corporation, Hamamatsu-shi, Shizuoka-ken (JP)

(72) Inventors: Yuji Yamada, Hamamatsu (JP); Koichi Kashiwazaki, Hamamatsau (JP); Satoshi Morita, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/196,567

(22) Filed: Jun. 29, 2016

(65) Prior Publication Data

US 2017/0004811 A1   Jan. 5, 2017

(30) Foreign Application Priority Data

Jun. 30, 2015  (JP) ................................ 2015-130523

(51) Int. Cl.
| | |
|---|---|
| *G01P 3/00* | (2006.01) |
| *G10H 1/02* | (2006.01) |
| *G10H 1/043* | (2006.01) |
| *G06F 3/16* | (2006.01) |
| *G10H 1/00* | (2006.01) |

(Continued)

(52) U.S. Cl.
CPC ............ *G10H 1/043* (2013.01); *G06F 3/162* (2013.01); *G10H 1/0008* (2013.01); *G10H 1/06* (2013.01); *G10H 7/02* (2013.01); *G10H 2220/096* (2013.01); *G10H 2220/116* (2013.01); *G10H 2250/475* (2013.01)

(58) Field of Classification Search
CPC ...... G10H 1/0008; G10H 1/02; G10H 1/0091; G10H 2210/211; G10G 1/00; G10K 11/175; G10K 11/1786
See application file for complete search history.

(56) References Cited

U.S. PATENT DOCUMENTS 4,862,783 A * 9/1989 Suzuki .................... G10H 1/06
                                                    84/622
5,461,191 A * 10/1995 Kondo .................... G10H 1/24
                                                    84/615

(Continued)

FOREIGN PATENT DOCUMENTS

| JP | H03269590 A | 12/1991 |
|---|---|---|
| JP | 3141380 B2 | 3/2001 |
| JP | 2013051530 A | 3/2013 |

OTHER PUBLICATIONS

Music Production Synthesizer Motif XF Reference Manual, 1-255, Yamaha Corporation, 2010. English translation provided.

*Primary Examiner* — Marlon Fletcher
(74) *Attorney, Agent, or Firm* — Rossi, Kimms & McDonwell LLP

(57) ABSTRACT

For a parameter used by a tone generator unit to generate an audio signal, type of an effect to be given to the audio signal and degree of the effect to be given to the audio signal are set according to an operation of a panel strip which functions as a combination of an increase control decrease controls with an upper cursor part and a lower cursor part. This setting is made so that when an operation to further decrease the degree of the effect to be given to less than zero is detected, the type of the effect to be given to the audio signal is changed.

32 Claims, 14 Drawing Sheets

(51) Int. Cl.
*G10H 1/06* (2006.01)
*G10H 7/02* (2006.01)

(56) References Cited

U.S. PATENT DOCUMENTS

| | | | |
|---|---|---|---|
| 2010/0024628 A1* | 2/2010 | Maruyama | G10H 1/0091 84/615 |
| 2013/0082951 A1 | 4/2013 | Tanaka et al. | |
| 2014/0130655 A1* | 5/2014 | Fukada | G10K 15/02 84/622 |
| 2015/0170624 A1* | 6/2015 | Yamauchi | G10H 1/10 84/600 |

* cited by examiner

{Fig. 1}
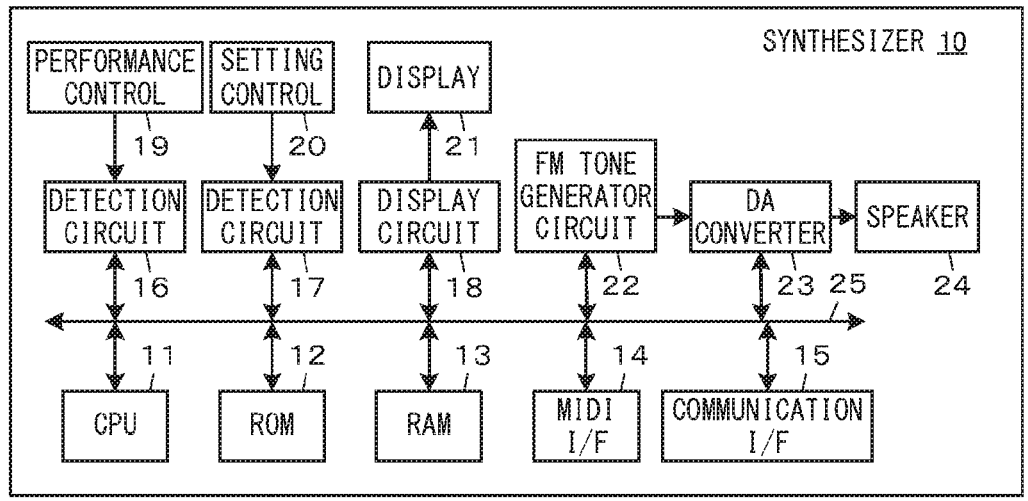
{Fig. 2}
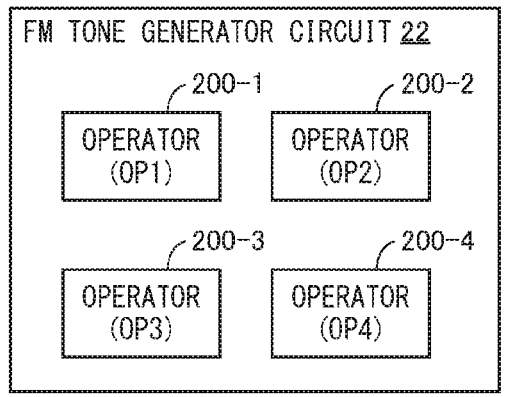
{Fig. 3}
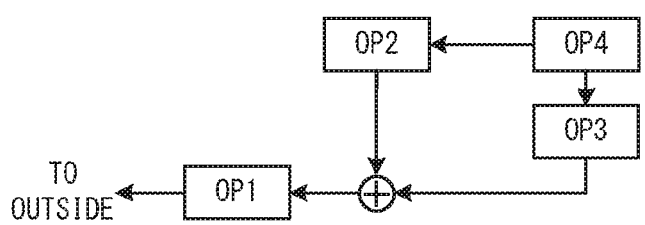

{Fig. 4}
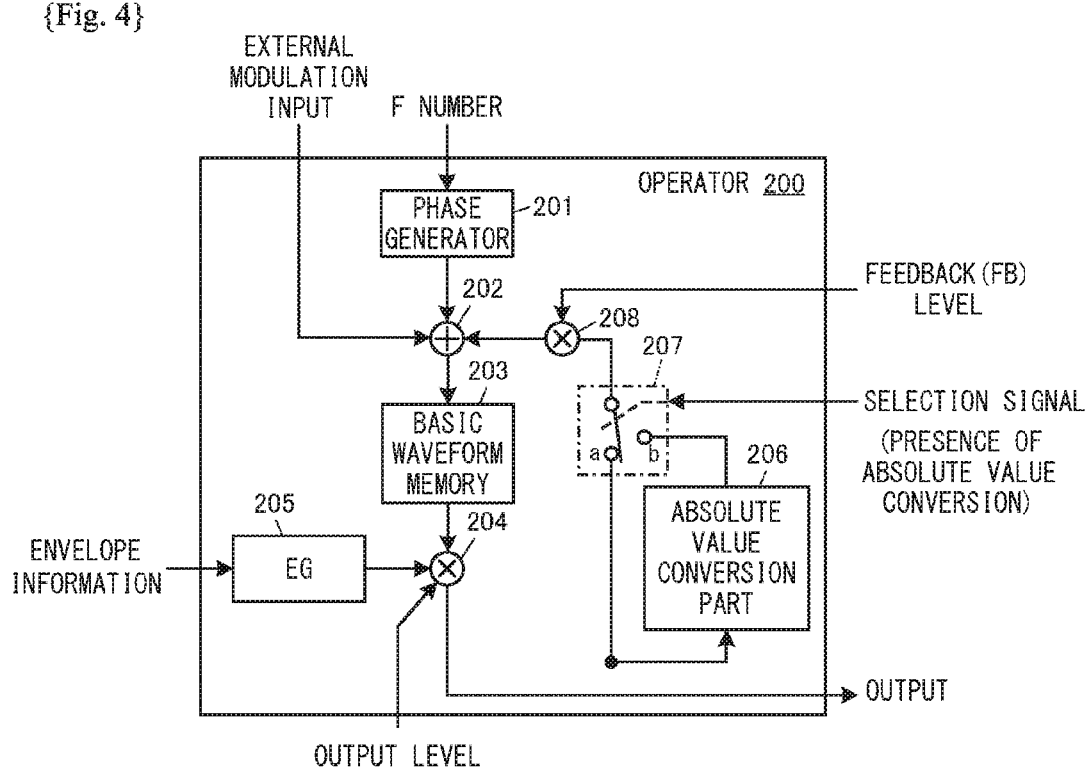
{Fig. 5}
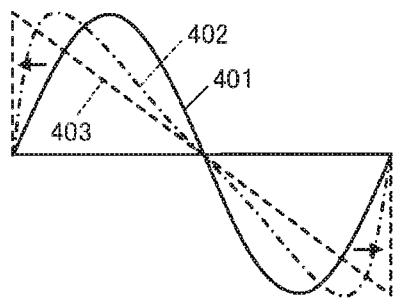
{Fig. 6}
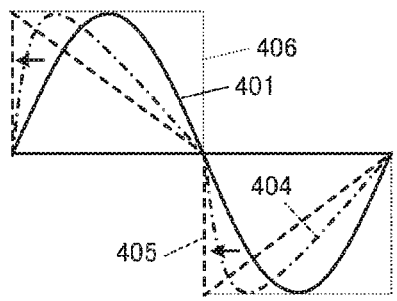

{Fig. 7}
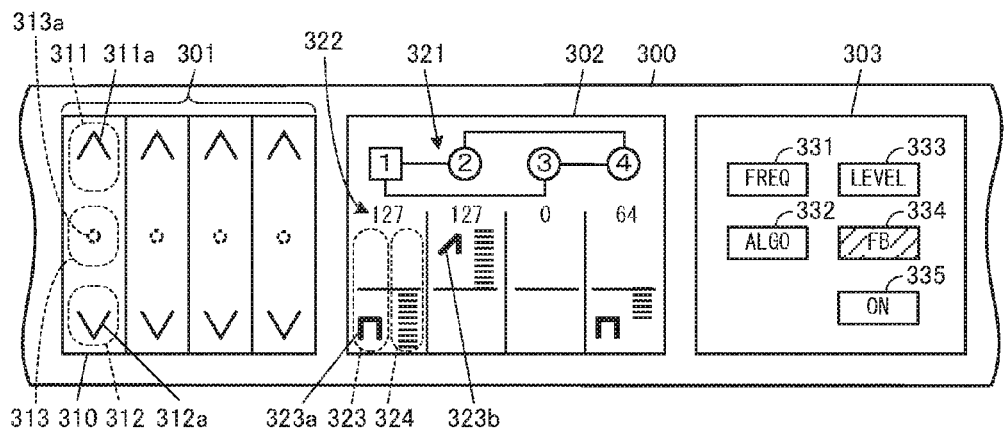
{Fig. 8}
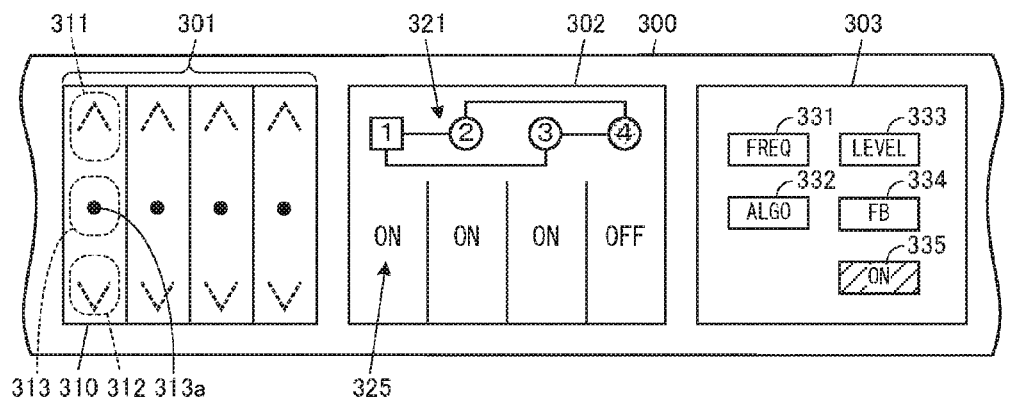

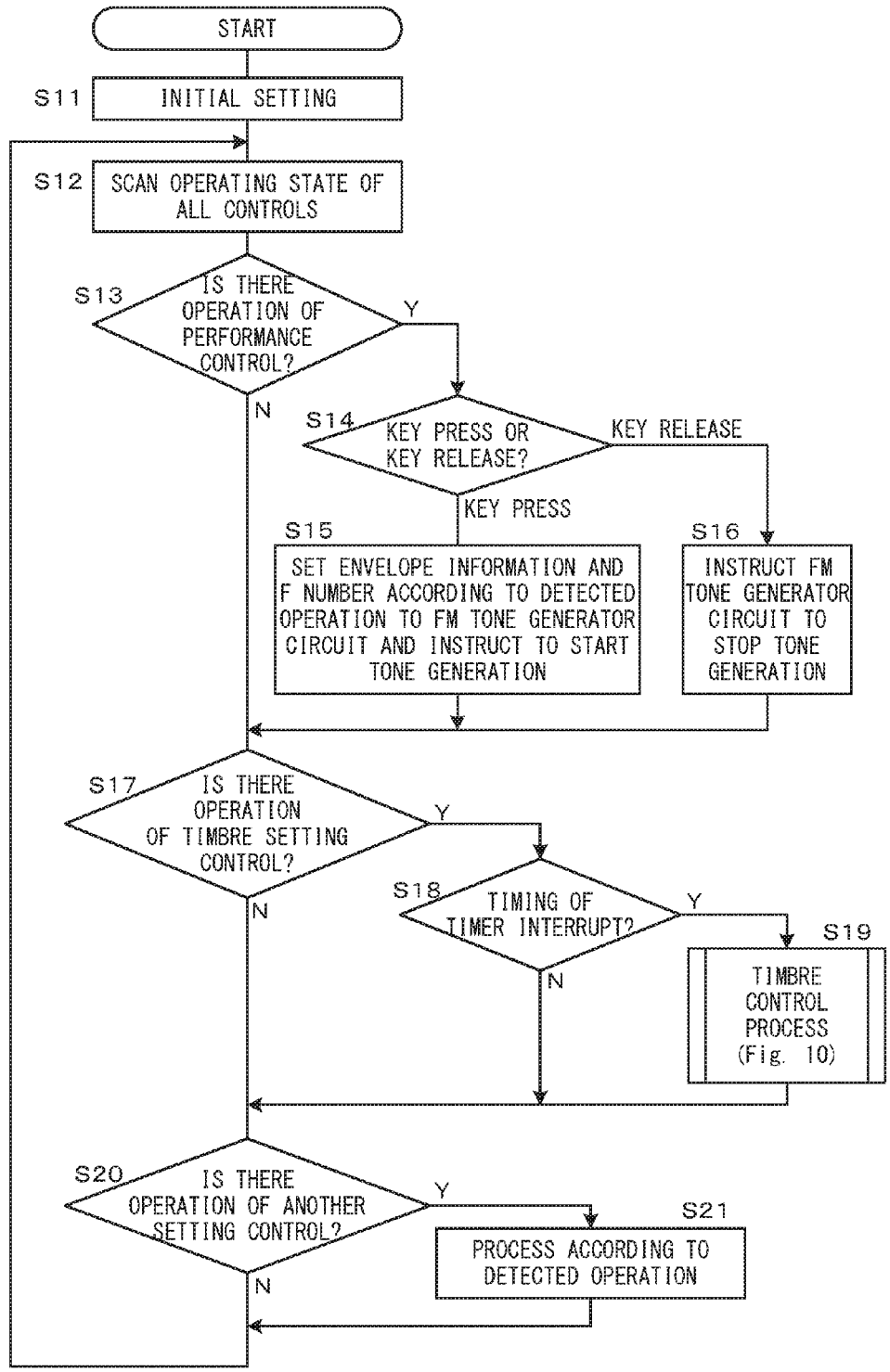
{Fig. 9}

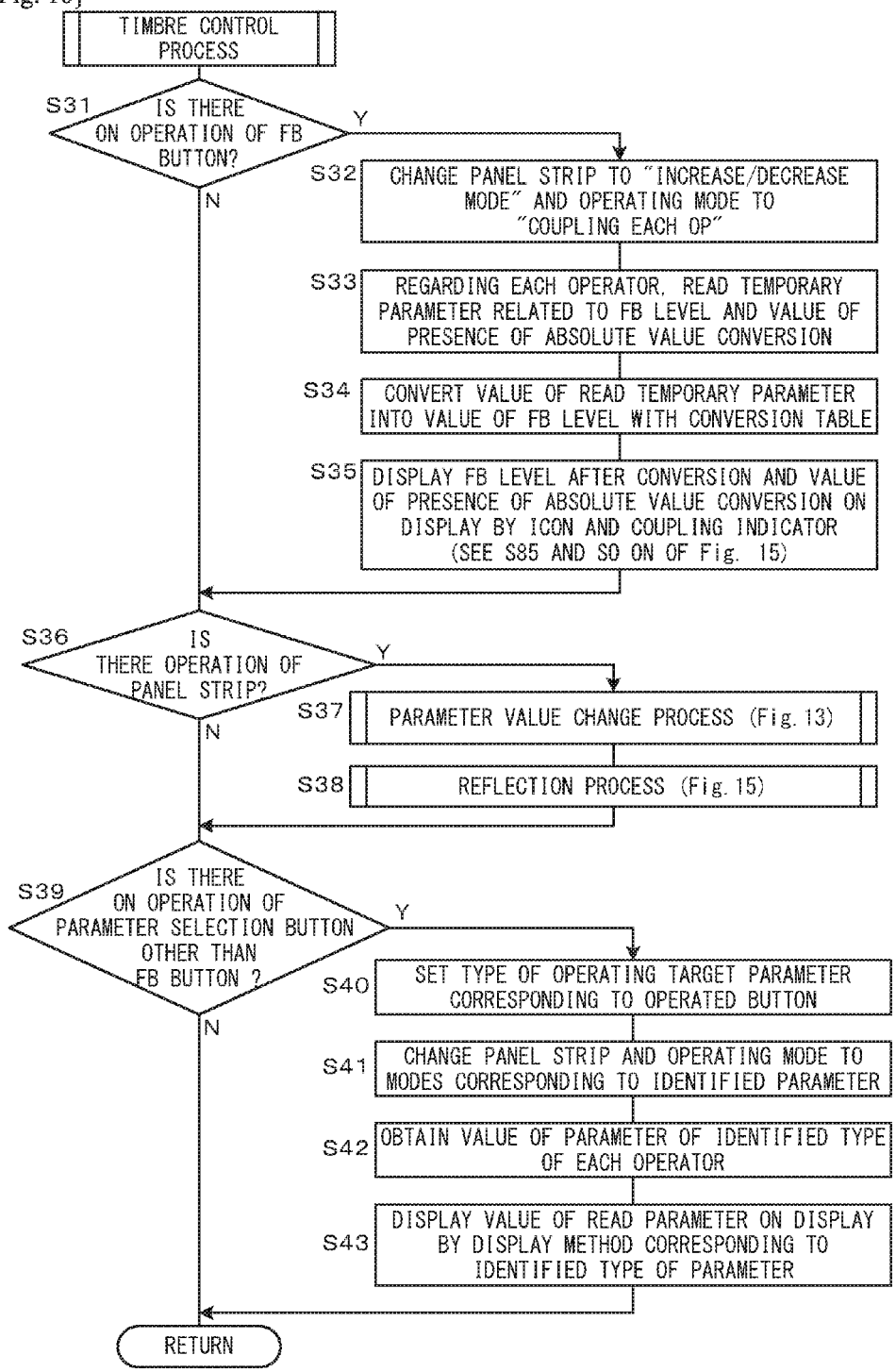

{Fig. 11}

| BUTTON | OPERATING TARGET PARAMETER | PANEL STRIP | DISPLAY METHOD | OPERATING MODE |
|---|---|---|---|---|
| FREQ | MODULATOR FREQUENCY | INCREASE/ DECREASE MODE | NUMERICAL DISPLAY | INCREASE/DECREASE EACH OP |
| ALGO | ALGORITHM | INCREASE/ DECREASE MODE | ALGORITHM DISPLAY | INCREASE/DECREASE COMMON |
| LEVEL | OUTPUT LEVEL | INCREASE/ DECREASE MODE | NUMERICAL DISPLAY | INCREASE/DECREASE EACH OP |
| FB | FB LEVEL AND PRESENCE OF ABSOLUTE VALUE CONVERSION | INCREASE/ DECREASE MODE | COUPLING INDICATOR | COUPLING EACH OP |
| ON | OP ON/OFF | BUTTON MODE | ON-OFF DISPLAY | TOGGLING EACH OP |
| ⋮ | ⋮ | ⋮ | ⋮ | ⋮ |

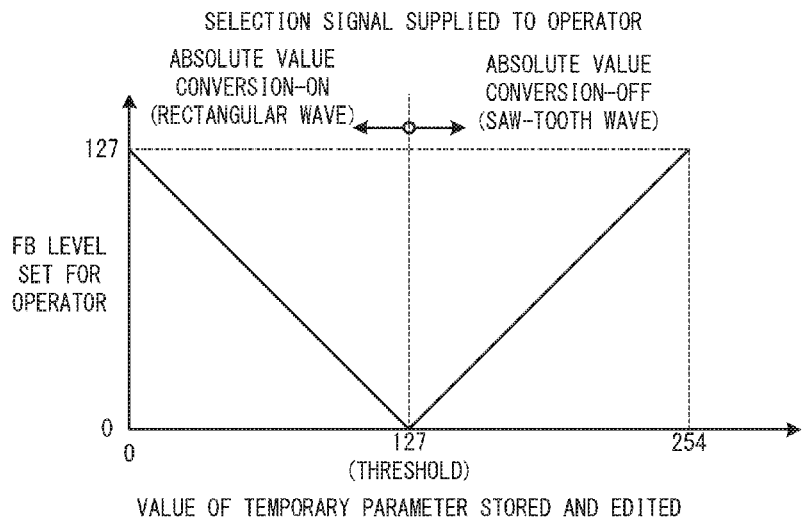

{Fig. 12}

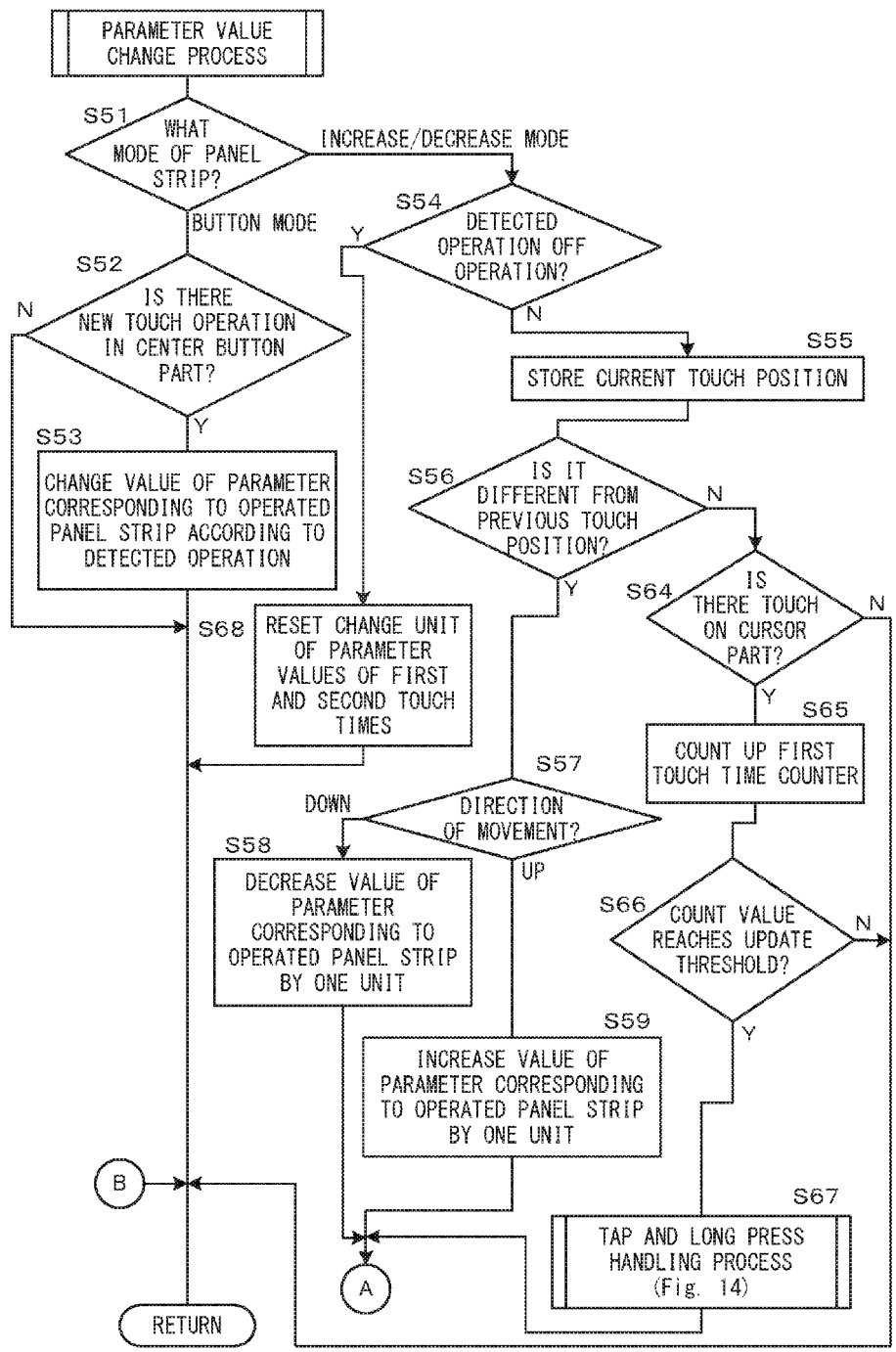

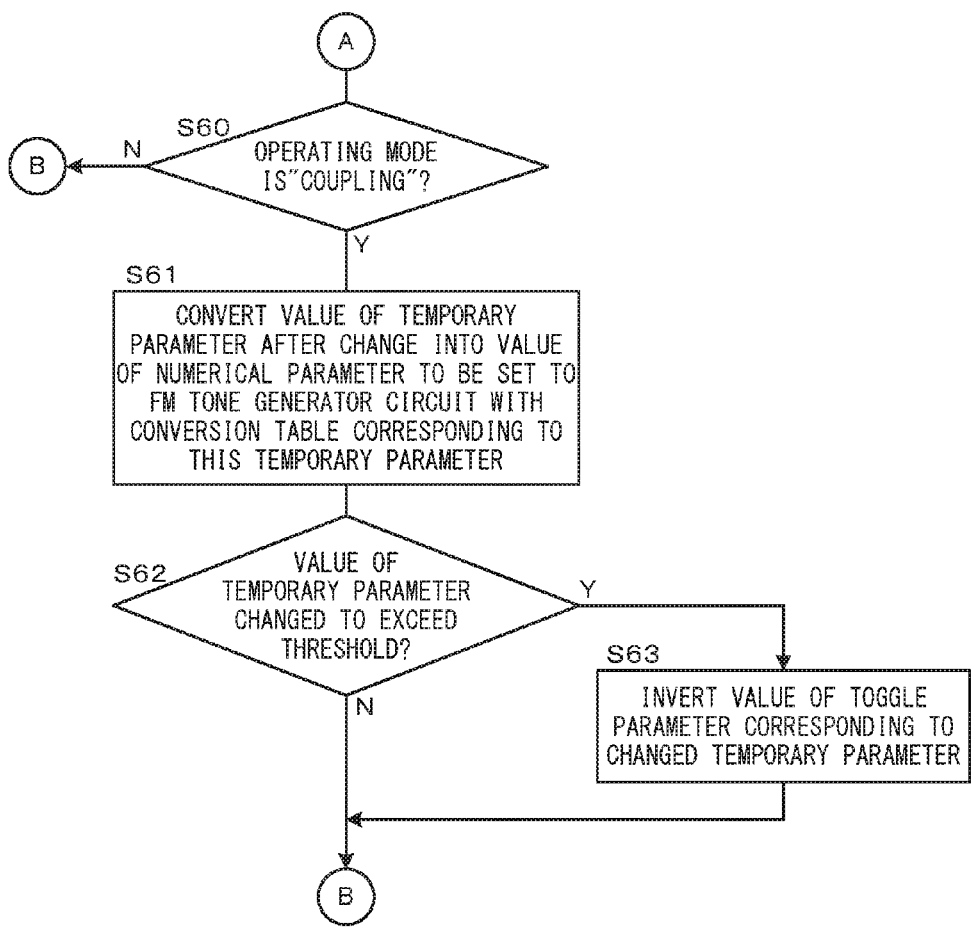
{Fig. 13B}

{Fig. 14}
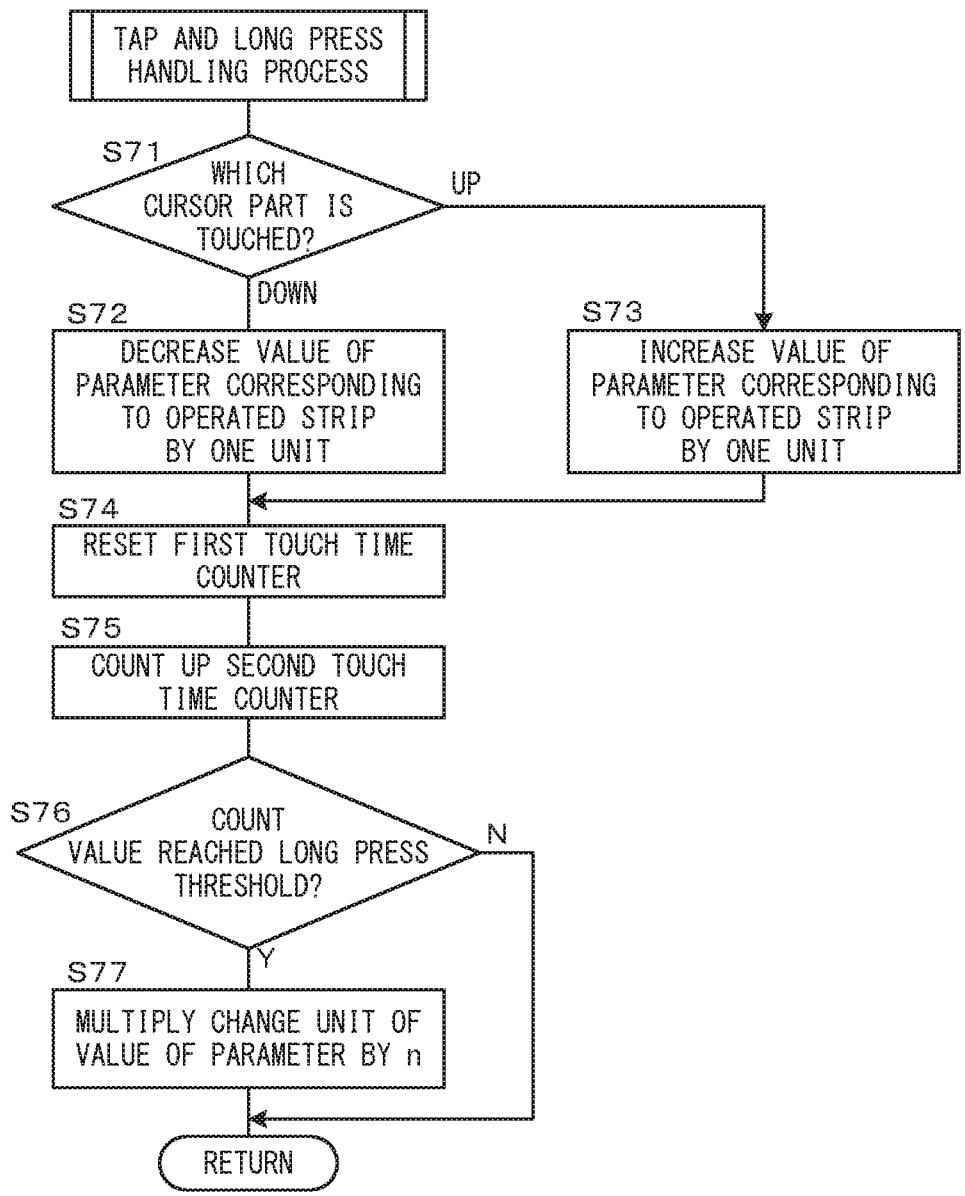

{Fig. 15}
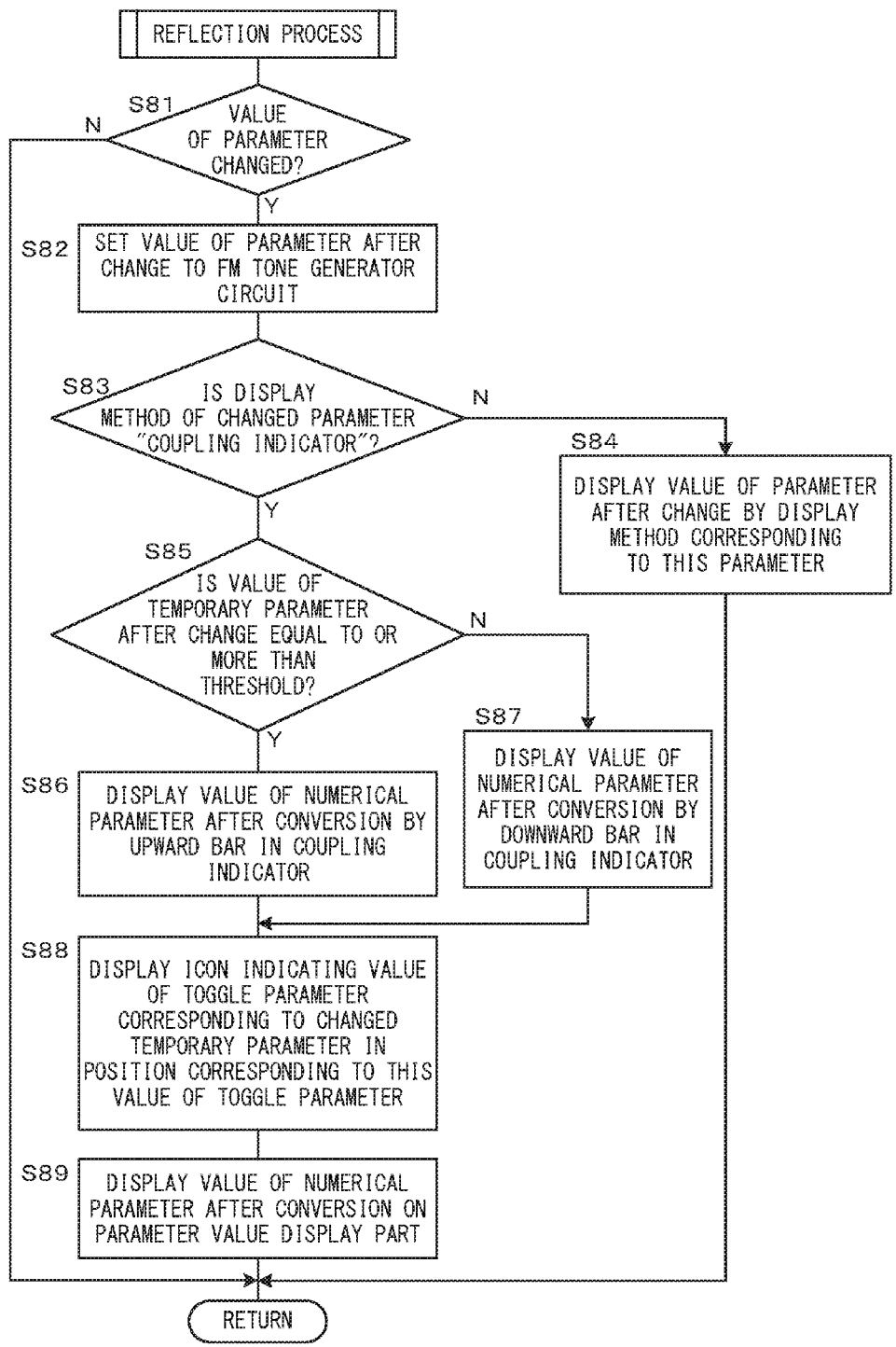

{Fig. 16}
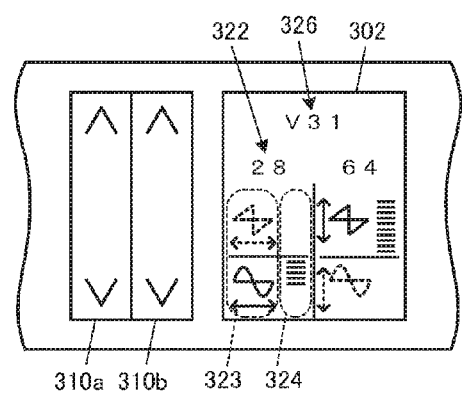
{Fig. 17}
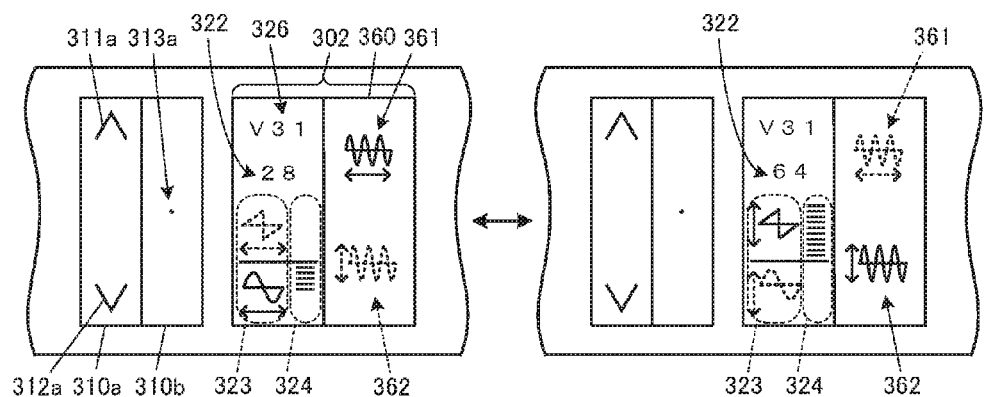

{Fig. 18}
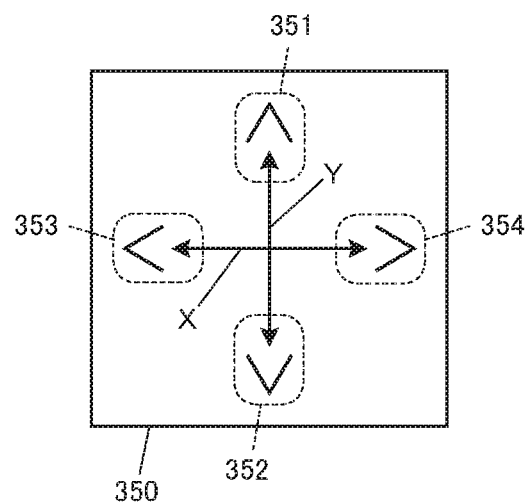
{Fig. 19}
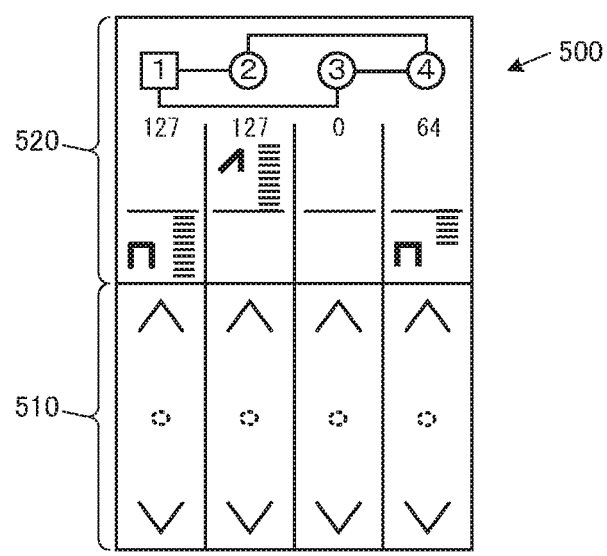

{Fig. 20A}
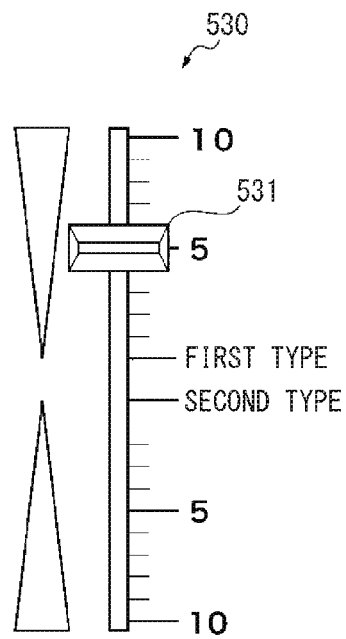
{Fig. 20B}
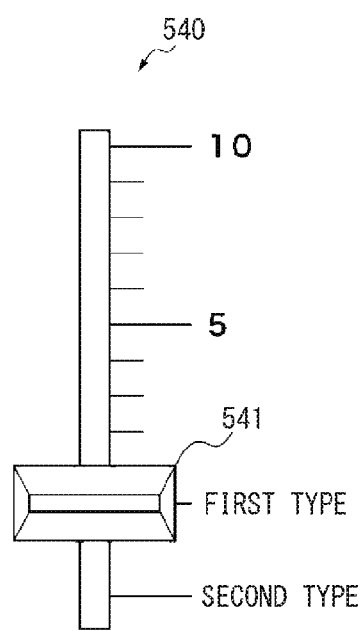
{Fig. 20C}
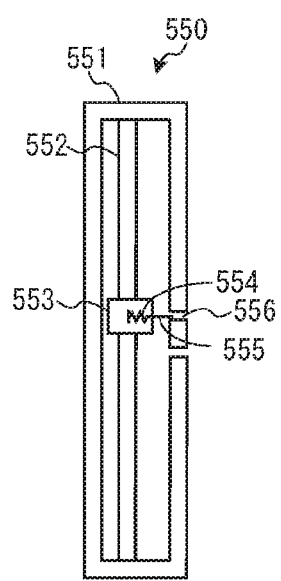

{Fig. 21}
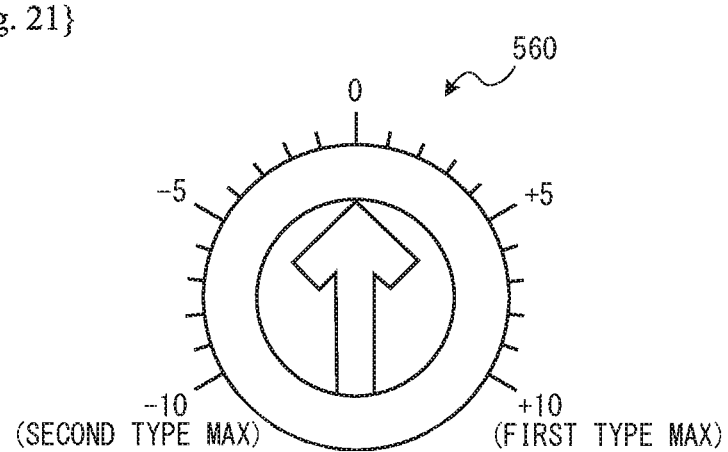

PARAMETER CONTROLLER AND METHOD FOR CONTROLLING PARAMETER

TECHNICAL FIELD

The invention relates to a parameter controller which controls parameters used by a tone generator unit to generate a audio signal, and a method for controlling a parameter used by a tone generator unit to generate an audio signal.

BACKGROUND ART

It has been conventionally known an electronic musical instrument which allows a user to edit a timbre used in a performance. For example, NPL1 discloses that the user can edit various parameters defining timbre in a voice mode of a synthesizer.

In such an electronic musical instrument, values of parameters edited by the user can be set in a tone generator unit, thereby generating an audio signal according to a performance operation by the user with timbre according to the values of parameters, and outputting sound according to the audio signal.

However, it is generally difficult to grasp relation between values of parameters and audibility of timbre, and the user adjusts values of various parameters while repeating listening again and again until a timbre with desired audibility is obtained.

CITATION LIST

Non Patent Literature

{NPL1} "MUSIC PRODUCTION SYNTHESIZER MOTIF XF REFERENCE MANUAL", Yamaha Corporation, 2010

SUMMARY OF INVENTION

Technical Problem

Now, values of parameters which should be operated by the user for editing timbre range widely. However, the number of controls which can be provided on an apparatus for allowing the operation is limited in aspects of an arrangement area and costs. Thus, it is necessary to repeat operations such as assigning a parameter to be edited to a control as needed and then operating the control to change the value of the parameter. This has a problem of poor operability.

Further, as parameters used by the tone generator unit for generating the audio signal, there may be cases where it is possible to set various parameters other than parameters which directly define timbre, including parameters related to a tone generation control method during a performance, such as whether to allow simultaneous generation of plural notes. In such cases, types of parameters to be set increase further, and the problem of operability becomes larger.

The invention has been made in view of such problems, and it is an object thereof to allow setting values of parameters used by a tone generator unit to generate an audio signal efficiently using limited number of controls.

Solution to Problem

In order to achieve the above-described object, a parameter controller according to the invention is a parameter controller configured to control a parameter used by a tone generator unit to generate an audio signal, the parameter controller including a controller configured to set, according to an operation of one increase and decrease control or one combination of an increase control and a decrease control, type of an effect to be given to the audio signal and degree of the effect of the type to be given to the audio signal, wherein the controller is configured to change, when the controller detects an operation to further decrease the degree of the effect to be given to the audio signal to less than zero, the type of the effect to be given to the audio signal.

In the above parameter controller, it is conceivable that the tone generator unit generates an audio signal by a frequency modulation method, and the type of the effect to be given to the audio signal set by the controller according to the operation is switched based on whether a particular processing in a generation algorithm of the audio signal in the tone generator unit is turned on or off.

Further, it is also conceivable that the particular processing is processing in feedback control of a read address in reading of an audio signal from a memory.

Further, it is also conceivable that the particular processing is absolute value conversion processing performed on a value of the audio signal generated by the tone generator unit, and the value is to be added to the read address in the feedback control of the read address.

Alternatively, it is conceivable that the type of the effect to be given to the audio signal set by the controller according to the operation is switched by changing a kind of a waveform characteristic to be modulated by the degree set by the controller in the generation algorithm of the audio signal in the tone generator unit.

It is also conceivable that while a first type is set as the type of the effect to be given to the audio signal, the controller increases the degree of the effect to be given according to an increasing operation on the one increase and decrease control or the one combination of the increase control and the decrease control, and decreases the degree of the effect to be given according to a decreasing operation on the one increase and decrease control or the one combination of the increase control and the decrease control, and when a decreasing operation to further decrease the degree of the effect to less than zero is detected, changes the type of the effect to be given to the audio signal to a second type, and that while the second type is set as the type of the effect to be given to the audio signal, the controller increases the degree of giving the effect to be given according to a decreasing operation on the one increase and decrease control or the one combination of the increase control and the decrease control, decreases the degree of the effect to be given according to an increasing operation on the one increase and decrease control or the one combination of the increase control and the decrease control, and when an increasing operation to further decrease the degree of the effect to less than zero is detected, changes the type of the effect to be given to the audio signal to the first type.

It is also conceivable that the parameter controller further includes a display controller configured to control display on an internal or external display, the display controller being configured to control the display to display, on the display, the type of the effect and the degree of the effect set by the controller by a coupling indicator including: a continuous numerical axis; a first indicator of the degree of an effect of a first type to be given when the controller sets the effect of the first type; and a second indicator of the degree of an effect of a second type to be given when the controller sets the effect of the second type.

It is also conceivable that the tone generator unit generates the audio signal by a frequency modulation method with a plurality of operators, the one increase and decrease control or the one combination of the increase control and the decrease control corresponding to each of the operators are provided as touch panels which accept a one-dimensional operation, and the touch panels are arrayed in a direction different from an operating direction of the touch panels, and according to an operation of the one increase and decrease control or the one combination of the increase control and the decrease control corresponding to any of the operators, the controller sets the type of the effect to be given to the audio signal generated by the operator and the degree of the effect to be given to the audio signal generated by the operator.

It is also conceivable that the parameter controller further includes: a touch sensor configured to separately detect operations on at least both end parts and a center part of a strip-shaped control part; and a sensor controller configured to selectively perform one of control in a first mode of using the touch sensor as the one increase and decrease control or the one combination of the increase control and the decrease control by disabling the detection of operation on the center part while enabling the detection of operation on the both end parts of the touch sensor, and control in a second mode of using the touch sensor as a button control for accepting an operation on a predetermined parameter used by the tone generator unit to generate an audio signal, by enabling the detection of operation on the center part while disabling the detection of operation on the both end parts of the touch sensor.

It is also conceivable that the parameter controller includes the one increase and decrease control with a movable operating portion configured to accept an operation by a user, and the operating portion moves along a continuous numerical axis comprising a first scale indicating the degree of the effect of a first type to be given and a second scale indicating the degree of the effect of a second type to be given, and indicates the type of the effect and the degree of the effect set by the controller by a position of the operating portion along the numerical axis.

Further, it is also conceivable that the parameter controller further includes an obstacle configured to provide a friction on movement of the operating portion at a position to set the degree of the effect to be given to the audio signal at zero.

The above configuration can be realized or embodied as an arbitrary style such as a system, a method, a computer program, a storage medium storing a computer program, other than the above device.

Advantageous Effects of Invention

With the configurations as described above, values of parameters used by a tone generator unit to generate an audio signal can be set efficiently using limited number of controls.

BRIEF DESCRIPTION OF DRAWINGS

FIG. 1 is a block diagram illustrating configuration of a synthesizer which is one embodiment of a parameter controller of the invention.

FIG. 2 illustrates a configuration of modules provided in an FM tone generator circuit illustrated in FIG. 1.

FIG. 3 illustrates an example of a connection state of operators illustrated in FIG. 2.

FIG. 4 illustrates a functional configuration of the operators illustrated in FIG. 2.

FIG. 5 illustrates an example of variation of waveform outputted by an operator according to FB level in the case of absolute value conversion-off.

FIG. 6 is illustrates an example of variation of waveform outputted by an operator according to FB level in the case of absolute value conversion-on.

FIG. 7 illustrates a configuration of a part for setting value of a timbre parameter in an operation panel provided in the synthesizer illustrated in FIG. 1.

FIG. 8 illustrates another state of the operation panel in FIG. 7.

FIG. 9 is a flowchart of a main routine of processing according to an operation by a user executed by a CPU of the synthesizer illustrated in FIG. 1.

FIG. 10 is a flowchart of timbre control process illustrated in FIG. 9.

FIG. 11 illustrates an example of a parameter information table.

FIG. 12 illustrates an example of a conversion table.

FIG. 13A is a flowchart of a part of parameter value change process illustrated in FIG. 10.

FIG. 13B is a flowchart continued from FIG. 13A.

FIG. 14 is a flowchart of tap and long press handling process illustrated in FIG. 13.

FIG. 15 is a flowchart of reflection process illustrated in FIG. 10.

FIG. 16 corresponds to FIG. 7 and illustrates another example of a configuration of the operation panel.

FIG. 17 corresponds to FIG. 16 and illustrates still another example of a configuration of the operation panel.

FIG. 18 is illustrates an example of use of a touch sensor accepting a two-dimensional operation.

FIG. 19 illustrates another configuration example of a touch sensor and a display.

FIG. 20A illustrates a modified example of an increase and decrease control.

FIG. 20B illustrates another modified example of an increase and decrease control.

FIG. 20C is a sectional view illustrating still another modified example of an increase and decrease control.

FIG. 21 illustrates still another modified example of an increase and decrease control.

DESCRIPTION OF EMBODIMENTS

Hereinafter, embodiments for carrying out the invention will be explained specifically based on drawings.

First, a synthesizer which is one embodiment of a parameter controller of the invention will be explained. FIG. 1 is a block diagram illustrating configuration of the synthesizer.

A synthesizer 10 illustrated in FIG. 1 is an apparatus having a function to accept an edit operation of timbre from a user, generate an audio signal of the timbre edited by the user according to a performance operation by the user, and output sound according to the generated audio signal.

The synthesizer 10 includes a CPU 11, a ROM 12, a RAM 13, a MIDI (Musical Instrument Digital Interface: trademark) interface (I/F) 14, a communication I/F 15, detection circuits 16, 17, a display circuit 18, an FM (Frequency Modulation) tone generator circuit 22, and a DA (Digital-Analog) converter 23, and they are connected via a system bus 25. The synthesizer 10 further has a performance control 19 connected to the detection circuit 16, a setting control 20 connected to the detection circuit 17, a display 21 connected to the display circuit 18, and a speaker 24 connected to the DA converter 23.

Among them, the CPU 11 is a controller for controlling overall operation of the synthesizer 10, and executes a desired program stored in the ROM 12 to control required hardware. This enables various functions including editing of parameters according to operation of the setting control 20, control of tone generation in the FM tone generator circuit 22 according to an operation of the performance control 19, and so on.

The ROM 12 is a non-volatile memory storing a control program executed by the CPU 11, and the like. The ROM 12 may be constituted of a flash memory which is a rewritable non-volatile memory.

The RAM 13 is a memory storing data which need to be temporarily stored, and used as a work memory of the CPU 11.

The MIDI I/F 14 is an interface for connecting a MIDI-enabled external apparatus thereto. The synthesizer 10 connects with a MIDI sequencer via, for example, the MIDI I/F 14, and makes the FM tone generator circuit 22 generate an audio signal according to performance data supplied from the MIDI sequencer, to thereby give an automatic performance.

The communication I/F 15 is an interface for communicating with another computer via a communication network. Any standards of communication may be used irrespective of wired or wireless.

The detection circuit 16 is a circuit for detecting an operation made on the performance control 19 and transmitting data of the operation to the CPU 11. The performance control 19 is a control for accepting a performance operation from the user. Here, the performance control is constituted of a keyboard and pedals which simulate a keyboard instrument such as a piano. However, it is also conceivable to provide a performance control simulating another type of instrument, such as a string instrument, a wind instrument, or a percussion instrument, or to use controls, such as appropriately arrayed buttons (also including a GUI (Graphical User Interface)), which are different from those in a general instrument as performance controls.

The detection circuit 17 is a circuit for detecting an operation performed on the setting control 20, and transmitting the operation to the CPU 11. The setting control 20 is a control for accepting a setting control on the synthesizer 10 from the user, and provided with various keys, buttons, rotary encoders, sliders, touch panels, and so on. A touch panel laminated on a liquid crystal display (LCD) which is the display 21 may be used.

The display circuit 18 is a circuit for controlling the display 21 to display various information on the display 21 according to an instruction from the CPU 11. The display 21 may include, for example, an LCD or a light emitting diode (LED).

The FM tone generator circuit 22, details of which will be described later, is a tone generator unit having a function to generate digital waveform data and supply the generated data to the DA converter 23. The digital waveform data is a digital audio signal, the FM tone generator circuit 22 generates the digital waveform data by a frequency modulation method based on values of various sound parameters set by the CPU 11 and values of parameters related to tone generation of each time, such as a pitch or envelope, supplied from the CPU 11 together with a tone generation starting instruction.

The DA converter 23 is a circuit for performing DA conversion on the digital audio signal supplied from the FM tone generator circuit 22, thereby generating an analog audio signal for driving the speaker 24.

The speaker 24 is a sound output device for outputting sound according to the audio signal supplied from the DA converter 23.

Next, the FM tone generator circuit 22 illustrated in FIG. 1 will be explained in more detail using FIG. 2 to FIG. 4. FIG. 2 illustrates modules provided in the FM tone generator circuit 22. FIG. 3 illustrates an example of a connection state of operators illustrated in FIG. 2. FIG. 4 illustrates a functional configuration of the operators illustrated in FIG. 2.

The FM tone generator circuit 22 has four operators (OP 200-1 to 200-4) (hereinafter "200" will be used when it is not necessary to identify an individual operator), as illustrated in FIG. 2, as modules used for generating one audio signal. Note that the number of operators is not limited to four. In a device which performs simultaneous generation of plural sounds, a set of operators as illustrated in FIG. 2 may be provided by the number of sounds to be generated simultaneously.

Each OP 200 can output an audio signal according to the values of various parameters by the configuration illustrated in FIG. 4. Further, at this time, each OP 200 can modulate an audio signal generated by itself based on an audio signal outputted by another OP 200 connected to a preceding stage. Four OPs 200 provided in the FM tone generator circuit 22 can be connected one another to form multiple stages to operate according to a topology selected by the user from among a large number of options registered in advance.

One example thereof is illustrated in FIG. 3.

In the example of FIG. 3, audio signals generated by OP2 and OP3 are modulated according to an audio signal generated by OP4, and moreover, an audio signal generated by OP1 is modulated according to an audio signal obtained by adding the audio signal generated by OP2 and the audio signal generated by OP3. The audio signal generated by OP1 is outputted to the outside (here the DA converter 23) as an output of the FM tone generator circuit 22. For other arrangements which can be employed, for example, see FIG. 3 of JP 3141380 B2.

Each OP 200 includes, as illustrated in FIG. 4, a phase generator 201, an adder 202, a basic waveform memory 203, multipliers 204, 208, an envelope generator (EG) 205, an absolute value conversion part 206, and a switch part 207. The functions of these parts may be achieved by hardware, achieved by a processor executing software, or by a combination thereof.

Among them, the phase generator 201 has a function to generate and output a phase value which increases in every sampling cycle by F number supplied from the outside (which refers to the outside of the OP 200, which is the same in the explanation of FIG. 4 below unless particularly described otherwise). The phase value increases at a constant speed from zero to an upper limit value as the time passes, and returns to zero when it reaches the upper limit value. A time required by this increase from zero to the upper limit value substantially matches one cycle of the audio signal generated by the OP 200, and thus the value of F number can be determined based on the pitch of the sound to be generated based on the F number.

The basic waveform memory 203 includes a memory for storing sample values of one cycle of a sinusoidal wave in various phases. In every sampling cycle, the basic waveform memory 203 reads the sample value of a phase indicated by the phase value supplied from the phase generator 201 via the adder 202, subjects the read sample value to an interpolation processing as necessary, and output the sample value. An appropriate sample value may be preferably stored at each address in advance such that a necessary sample value can be obtained by reading data from the memory with the phase value simply being an address.

Here, when no addition is performed in the adder 202 to the phase value outputted by the phase generator 201, the basic waveform memory 203 outputs waveform data of a sinusoidal wave of a cycle according to the F number according to phases which progress in a constant speed. However, in the adder 202, an external modulation input supplied from the outside and an output of the multiplier 208 which is a modulation value of feedback modulation are added, and thus the progression of phase is not in a constant speed. Accordingly, the output of the basic waveform memory 203 also becomes a complicated waveform.

Next, the EG 205 has a function to generate an envelope waveform indicating a temporally change in sound volume based on envelope information supplied from the outside. The EG 205 supplies a sound volume adjustment value according to elapsed time from the beginning of tone generation to the multiplier 204, according to the generated envelope waveform.

The multiplier 204 multiplies the sample value of each sampling cycle outputted by the basic waveform memory 203 by the sound volume adjustment value generated by the EG 205 and the output level supplied from the outside. This allows adjusting the sample value to the level corresponding to the output sound volume. The sample value after this multiplication is outputted as an audio signal generated by the OP 200.

Further, the sample value after the multiplication is used for feedback control, and hence is inputted to the multiplier 208. However, with the switch part 207, it is possible to select whether the sample value after the multiplication is inputted as it is (selecting the terminal "a", called "absolute value conversion-off"), or the sample value is converted into an absolute value thereof in the absolute value conversion part 206 and then inputted (selecting the terminal "b", called "absolute value conversion-on"). This switch part 207, specifically, can include a selector which leads one of two inputs a, b constituted of a plurality of bits to an output side (upper side in the diagram) according to the selection signal (switch signal) supplied from the outside. The selector can be formed by an AND circuit, an OR circuit, an inverter, or the like.

The multiplier 208 multiplies the inputted sample value or the inputted absolute value thereof by the value of FB level supplied from the outside, and supplies the result to the adder 202. The larger the value of FB level, the higher the influence of the previous value to the next sample value, and as a result the output waveform of the OP 200 is the more largely deviated from the sinusoidal wave. When the value of FB level is 0, the previous sample value does not affect the next sample value. This point will be described later using FIG. 5 and FIG. 6.

Note that among the above-described data supplied from the outside, the F number is set by the CPU 11 in response to every tone generation start instruction according to the pitch of a sound to be generated and the value of a timbre parameter related to frequency adjustment in each OP. The envelope information is set by the CPU 11 in response to every tone generation start instruction according to the sound volume of a sound to be generated and the value of a timbre parameter related to sound volume adjustment in each OP.

The external modulation input can be an audio signal outputted by another OP 200, data generated by other than the OP 200 (for example, a factor of vibrato), or data obtained by adding them.

The output level, the presence of absolute value conversion, and the FB level are set by the CPU 11 according to the value of the relevant timbre parameter. Note that the value of the timbre parameter can be edited by the user, and can be reflected on operation of the OP 200 in real time even during generation of an audio signal. Further, values can be set individually in each OP 200. Moreover, the set of values of timbre parameters for all OPs which are applied at a certain time point can be stored as data defining one timbre, and thereafter the set can be recalled and reflected on operation of each OP.

Next, the effect of feedback control of the phase value will be explained using FIG. 5 and FIG. 6.

FIG. 5 illustrates an example of variation the waveform outputted by the OP 200 according to the FB level in the case of absolute value conversion-off, and FIG. 6 illustrates an example of variation the waveform outputted by the OP 200 according to the FB level in the case of absolute value conversion-on.

In either case, when the external modulation input is not considered, if the FB level is 0, the waveform outputted by the OP 200 becomes a sinusoidal wave as depicted by a solid line 401.

When the FB level is increased from here, in the case of the outside value conversion-off, as illustrated in FIG. 5, the peak value deviates to an end on both the positive side (upper side in the diagram) and the negative side of the sample value, and the waveform varies to a dot-and-dash line 402, and further to a dashed line 403. When the FB level becomes sufficiently high, the output waveform becomes almost a saw-tooth wave. This waveform is a waveform including all harmonic components with the sinusoidal waveform depicted by the solid line 401 being a fundamental tone.

The above waveform in the case of absolute value conversion-off is, as audibility, timbre like a stringed instrument such as a violin or a cello, or an open wind instrument such as a trumpet or horn.

On the other hand, in the case of absolute value conversion-on, as illustrated in FIG. 6, it is the same as the case of FIG. 5 on the positive side of the sample value. However, the peak position deviates to the center side on the negative side, and the waveform varies to a dot-and-dash line 404 and further to a dashed line 405. This waveform brings about audibility close to a rectangular wave depicted by a dashed line 406 when the FB level becomes sufficiently high. Further, the waveform of the dashed line 405 includes only odd harmonics similarly to the rectangular wave, and does not include harmonics of even multiples.

The above-described waveform in the case of absolute value conversion-on is, as audibility, timbre like a closed-tube instrument such as a clarinet.

In this way, by adjusting the FB level and the absolute value conversion-on and off, the OP 200 can be controlled to generate an audio signal with a variety of audibility. It can also be said that on and off of the absolute value conversion are operations to give different effects to an audio signal generated by the OP 200, and the degree of its effect varies by the value of FB level.

Further, when the FB level is zero, the same waveform is obtained regardless of whether the absolute value conversion is on or off, and in this position of "0" (zero), the waveform does not change even when the on and off of the absolute value conversion is switched. Accordingly, for example, when the FB level is gradually decreased from the maximum value in the state of the absolute value conversion-off, the absolute value conversion is turned on when the FB level has become 0, and moreover in this state the FB level is increased again to the maximum value, the waveform outputted from the OP 200 is varied continuously from the waveform of the dashed line 403 of FIG. 5, through the waveform of the solid line 401, to the waveform of the dashed line 405 of FIG. 6.

One characteristic point of this embodiment is that an operation based on a plurality of types of parameters, such as type of an effect to be given to an audio signal and the degree thereof, can be set according to an operation of one increase and decrease control or a combination of an increase control and a decrease control. Hereinafter, this point will be explained in detail.

First, FIG. 7 and FIG. 8 illustrate configurations of a part for setting values of timbre parameters in the operation panel provided in the synthesizer 10. FIG. 7 and FIG. 8 illustrate configurations of the same part on the operation panel, but the state of display of respective parts are different since the types of editing target parameters are different.

The operation panel 300 illustrated in FIG. 7 and FIG. 8 includes, roughly divided, a touch panel part 301, a display 302, and a button group 303. The touch panel part 301 and the button group 303 are parts of the setting control 20, and the display 302 is a part of the display 21.

Among them, the touch panel part 301 includes four panel strips 310, each of which being a strip-shaped touch panel. Each panel strip 310 has a function to locate a touch position in a long-side direction thereof when a user touches the panel strip 310 with a finger. The touch position in a short-side direction is either of being sensed or not sensed and hence is unique. For such a sensor which one-dimensionally detects a touch position, for example, one described in JP 2013-51530 A can be used.

Further, on each panel strip 310, a set of an upper cursor mark 311a and a lower cursor mark 312a is formed on opposite, upper and lower ends, and a button mark 313a is formed in a center portion. The panel strip 310 has a lamp on the backside of each of these marks and is able to control lighting and lighting out thereof.

In the state of FIG. 7, in the panel strip 310, an upper cursor part 311 is used as a button for instructing to increase the value of the parameter, a lower cursor part 312 is used as a button for instructing to decrease the value of the parameter, and the panel strip 310 is made to function as a combination of an increase control and a decrease control. Then, to indicate this, the upper cursor mark 311a and the lower cursor mark 312a are turned on, and the button mark 313a is turned off (turned off state is denoted by a dashed line).

Note that in the state of FIG. 7, further, the entire panel strip 310 is made to function as one increase and decrease control for instructing to increase the value of the parameter by an operation to slide a finger (such as a flick operation or a drag operation) upward, and decrease the value of the parameter by an operation to slide a finger (such as a flick operation or a drag operation) downward.

Further, in the state of FIG. 8, in the panel strip 310, only the center button part 313 is used as a button for instructing to change the value of the parameter, and an operation on any other part is ignored. To indicate this, conversely to the state of FIG. 7, the upper cursor mark 311a and the lower cursor mark 312a are turned off, and the button mark 313a is turned on.

Which of the mode of FIG. 7 or the mode of FIG. 8 is to be enabled is determined according to the type of the parameter selected as an operating target. Processing to change the value of the parameter according to detection of an operation in each of these modes will be described later using flowcharts of FIG. 9 and so on.

Next, the display 302 is a display for displaying a screen including the current values of the parameters selected as operating targets. Display style of values of the parameters on the screen differs according to the types of the parameters selected as the operating targets.

In the example of FIG. 7, the FB level and the presence of absolute value conversion for each OP 200 are selected as the operating targets. Then, the four panel strips 310 provided in the touch panel part 301 are respectively used for operating the FB level and the presence of absolute value conversion for the OPs 200-1, 200-2, 200-3, 200-4 in order from the left. As will be described later, in ether of a case where the panel strip 310 is used as a combination of an increase control and a decrease control, or a case where the panel strip 310 is used as one increase and decrease control, the values of parameters of both the FB level and the presence of absolute value conversion can be operated through an operation of one panel strip 310.

In the display 302, there are provided regions for displaying the values of the FB level and the presence of absolute value conversion for the OPs 200-1, 200-2, 200-3, 200-4 in order from the left, so as to correspond to the arrangement of the panel strip 310.

In the region for displaying the values of parameters for the OP 200-1 on the leftmost side, in a parameter value display part 322, the value of FB level is displayed by a numerical value, and the value of FB level is also displayed by a graph using a coupling indicator 324. However, this graph display also reflects the value of presence of absolute value conversion. When the value of presence of absolute value conversion is "absolute value conversion-off", the value of FB level is displayed by a bar (first indicator) extending upward from a line in the center part of the coupling indicator 324. When the value of presence of absolute value conversion is "absolute value conversion-on", the value of FB level is displayed by a bar (second indicator) extending downward from the line in the center part of the coupling indicator 324. The first indicator and the second indicator form a coupling indicator having a continuous numerical axis.

Further, in an icon display part 323, the value of presence of absolute value conversion is displayed by an icon indicating a waveform corresponding to the value of presence of absolute value conversion. Regarding the OP 200-1, the value is "absolute value conversion-on", and an icon 323a of a rectangular shape corresponding to the value is displayed. Regarding the OP 200-2, the value is "absolute value conversion-off", and an icon 323b of a saw-tooth wave corresponding to the value is displayed in the second display area from the left.

Note that the display position of the icon 323a, 323b in the vertical direction is on the side to which the bar extends in the coupling indicator 324, and also in this point, the characteristics of the waveform generated by each OP 200 can be easily understood. For example, when the bar of the coupling indicator 324 extends upward, the characteristic similar to a saw-tooth wave is strong, and when the bar extends downward, the characteristic similar to a rectangular wave is strong.

In an operator connection display part 321, displayed is a diagram illustrating connection topology of four OPs 200-1 to 200-4. A number surrounded by a square indicates an OP which is a "carrier" generating an audio signal for outputting to the outside, and a number surrounded by a circle indicates an OP which is a "modulator" generating an audio signal for modulating an audio signal in another OP.

In the example of FIG. 8, an on-parameter defining validity or invalidity of operation of each OP 200 is selected as an operating target. The value which can be taken by the on-parameter is one of two, "ON (valid)" and "OFF (invalid)", and its value is displayed by a character in an on/off display part 325 of the display area corresponding to each OP 200.

Further, the display of the operator connection display part 321 is basically the same as in the case of FIG. 7, but for OP for which the value of the on-parameter is "OFF", being off is indicated by graying out.

Next, the button group 303 is a group of buttons for selecting a type of parameters as targets of operation using the touch panel part 301. In the button group 303, there are provided a FREQ button 331, an ALGO button 332, a LEVEL button 333, an FB button 334, and an ON button 335.

Among them, the FREQ button 331 is a button for selecting a parameter related to frequency adjustment of each OP 200, the ALGO button 332 is a button for selecting a connecting topology of the OPs 200, the LEVEL button 333 is a button for selecting a parameter related to a volume adjustment of each OP 200, the FB button 334 is a button for selecting the FB level and the presence of absolute value conversion for each OP, and the ON button 335 is a button for selecting the on-parameter for each OP 200, as the operating targets.

Next, processing executed by the CPU 11 in response to an operation made on the synthesizer 10 by the user will be explained using flowcharts. Note that the operation mentioned here includes operations on positions other than those illustrated in FIG. 7 and FIG. 8.

First, FIG. 9 illustrates a flowchart of a main routine of processing related to an operation by a user.

The CPU 11 starts processing illustrated in the flowchart of FIG. 9 when the synthesizer 10 is activated, first performing necessary initial setting (S11) and then repeating execution of process of step S12 and so on.

In the process of the repeated part, the CPU 11 first scans operating states of all the controls provided in the synthesizer 10 (S12). The scan target includes not only the setting control 20 but also the performance control 19.

When an operation of the performance control 19 is detected by the scan (Yes in S13), the CPU 11 performs tone generation control on the FM tone generator circuit 22 according to the detected operation. That is, when the key press operation is detected (Yes in S14), the CPU 11 sets an envelope information and an F number according to the detected operation to each OP 200 of the FM tone generator circuit 22, and instructs the FM tone generator circuit 22 to start tone generation (S15). When a key release operation is detected, the CPU 11 instructs the FM tone generator circuit 22 to stop tone generation (S16).

More specifically, the CPU 11 generates envelope information including an attack level corresponding to velocity of the key press operation and a timbre parameter related to sound volume adjustment which is currently set, so as to generate an F number for achieving the pitch corresponding to the note number of the key press operation. Regarding the sound volume, the parameter of output level according to the velocity may be set to each OP 200.

In either case, upon reception of the tone generation start instruction in step S15, the FM tone generator circuit 22 generates an audio signal according to the values of various parameters set at this point, and outputs the generated audio signal to the DA converter 23. By this output, sound output from the speaker 24 is also started. Further, upon reception of the tone generation stopping instruction of step S16, the FM tone generator circuit 22 stops generation of audio signal being executed.

Next, upon detection of an operation of the setting control 20 for setting the timbre parameter (Yes in S17), if it is a timing of timer interrupt (Yes in S18), the CPU 11 executes timbre control process of FIG. 10 according to the detected operation (S19). If it is not the timing of timer interrupt, the process according to the detected operation is not performed here. The operation of the setting control 20 need not be reflected on operation of the synthesizer 10 so quickly in comparison with the operation of the performance control 19, and thus the process is skipped for decreasing the load of processing.

Further, upon detection of an operation of another setting control 20 (Yes in S20), the CPU 11 executes a process according to the detected operation (S21). This process can include a process similar to step S19. The process of step S21 is less related to the characteristics of this embodiment, and hence its detailed explanation is omitted.

Next, FIG. 10 is a flowchart of timbre control process executed in step S19 of FIG. 9.

In the process of FIG. 10, upon detection of an on-operation of the FB button 334 (Yes in S31), the CPU 11 first executes process of steps S32 to S35. The process here is that the process (S40 to S43) executed when an on-operation of a parameter selection button other than the FB button 334 is detected (Yes in S39) is concretized and illustrated for the case of the FB button 334.

Accordingly, steps S40 to S43 will be firstly explained, but before these steps, a parameter information table used for the process in this part will be explained.

The synthesizer 10 stores, in the ROM 12, information related to parameters which can be operated using the panel strip 310 as a parameter information table as illustrated in FIG. 11.

The parameter information table includes information of "button", "operating target parameter", "panel strip", "display method", "operating mode".

Among them, the "button" is identification information of a parameter selection button which is operated for selecting an operation target parameter.

The "operating target parameter" is identification information indicating the type of a parameter to be an operating target. As explained using FIG. 7 and FIG. 8, by using the plurality of panel strips 310, the same types of parameters related to a plurality of OPs 200 can be operating targets at the same time. Thus, for the parameter to be an operating target, it is preferable to identify the type of the parameter instead of identifying what OP the parameter is for.

The "panel strip" is information indicating in which mode the panel strip 310 is used when the parameter indicated by the "operating target parameter" is edited. Here, one of "increase/decrease mode" to use the panel strip 310 as the increase and decrease control as explained using FIG. 7 and "button mode" to use the panel strip 310 as one button as explained using FIG. 8 is specified.

The "display method" is information indicating a display method of values of parameters. As the method of display which can be set here, various types are conceivable. For example, "numerical display" is a method of displaying a value by a numerical value as in the parameter value display part 322. "Algorithm display" is a display similar to that in the operator connection display part 321, and substantially a method dedicated to display of a connection topology among OPs 200. "Coupling indicator" is a display method combining the parameter value display part 322, the icon display part 323, and the coupling indicator 324, which is explained using FIG. 7. "On/off display" is a display method using the on/off display part 325 which is explained using FIG. 8.

The "operating mode" is information indicating how the value of a parameter is changed according to an operation of the panel strip 310. First, as for the latter half part, the "for each OP" indicates that the panel strip 310 and the OP 200 correspond to each other, and the value of a parameter for one OP 200 is operated by one panel strip 310. The "common" indicates that a common operation is performed for all OPs by using all the panel strips 310.

Further, in the former half part, the "increase/decrease" indicates that the value of the operation target parameter is simply increased or decreased according to an operation of the increase and decrease control. The "coupling" indicates that values of a numerical parameter like the FB level and a toggle parameter like the presence of absolute value conversion as the operation target parameters are changed according to an operation of one increase and decrease control or a combination of an increase control and a decrease control, which is explained using FIG. 7. The "toggle" indicates that the value of the operation target parameter is changed by toggling according to an operation of a button.

Note that in the synthesizer 10, when parameters are operated in the mode of "coupling", besides numerical parameters to be actually reflected on operation of the synthesizer 10, a temporary parameter to conveniently increase and decrease the value thereof similarly to the case of "increase/decrease" according to an operation of the increase and decrease control is also prepared. Then, the temporary parameter is converted by using a predetermined table, so as to obtain the value of the numerical parameter to be reflected on operation.

The data of this conversion table will be explained using FIG. 12.

Note that the value of FB level here can take 128 grades of integer values from 0 to 127. In this case, for the value of the temporary parameter, there may be 256 grades, which correspond respectively to 128 grades of absolute value conversion-on and another 128 grades of absolute value conversion-off. However, when the value of FB level is 0, regardless of whether the absolute value conversion is on or off, it is made to correspond to a common value of the temporary parameter, and the value of the temporary parameter is in 255 grades (from 0 to 254). The correspondence of the value of FB level and the value of presence of absolute value conversion with the value of the temporary parameter is as illustrated in a graph in FIG. 12.

However, regarding the value of presence of absolute value conversion, instead of conversion using the table, the value is inverted when the value of the temporary parameter is changed to exceed a threshold (which is the value of the temporary parameter corresponding to the value "0" of FB level. In the example of FIG. 12, it is "127"). However, the value of presence of absolute value conversion corresponding to when the FB level is 0 may be determined to either on or off, so as to allow performing conversion using the table also for the value of presence of absolute value conversion.

Let us return to the explanation of FIG. 10.

In the process of steps S40 to S43, the CPU 11 first refers to the parameter information table of FIG. 11 so as to identify the type of the operating target parameter corresponding to the button whose operation is detected in step S39 (S40). Next, the CPU 11 refers to the parameter information table so as to change the mode of the panel strip 310 and the operating mode of the parameter to the mode corresponding to the parameter identified in step S40 (S41).

Thereafter, the CPU 11 obtains the value of a parameter of the type identified in step S40 for each OP 200 (S42), and displays it on the display 302 by a display method corresponding to the identified type (S43).

The process of steps S32 to S35 is of applying this to the parameters of FB level and the presence of absolute value conversion. That is, since the type of the operating target parameter is already known, the CPU 11 first changes the mode of the panel strip 310 and the operating mode of the parameter to the "increase/decrease mode" and the "each OP coupling" corresponding to the FB level, respectively (S32).

Thereafter, the CPU 11 reads the value of the temporary parameter related to the FB level and the value of presence of absolute value conversion for each OP 200 so as to perform display of a coupling indicator method corresponding to the FB level (S33), and converts the value of the temporary parameter into the value of FB level (S34). Then, the CPU 11 displays the FB level after conversion and the read value of presence of absolute value conversion on the display 302 by the icon and the coupling indicator 324 (S35). Note that the display process of step S35 is similar to step S85 and so on of FIG. 15, which will be described later.

Further, when an operation of the panel strip 310 is detected in the process of FIG. 10 (Yes in S36), parameter value change process illustrated in FIG. 13 (S37) and reflection process (S38) illustrated in FIG. 15 are executed.

Note that when there is any control that can be operated other than the panel strip 310 and the parameter selection button in the process of FIG. 10, process according to the detected operation is performed also on the control.

Next, FIG. 13A and FIG. 13B illustrates a series of flowchart of the parameter value change process executed in step S37 of FIG. 10.

In this process, the CPU 11 first determines the mode of the panel strip 310 set in steps S32 and S40 of FIG. 10 (S51). When this is the "button mode", if the operation detected this time is a new touch operation on the center button part 313 (Yes in S52), the CPU 11 changes according to the detected operation the value of the parameter corresponding to the panel strip 310 on which the detected operation is performed (S53). For example, the value of the parameter related to the OP 200 corresponding to the relevant panel strip 310 is changed by toggling. After the above, the process of FIG. 13A is finished, returning to the original process.

When the detected operation is not the operation on the center button part 313, this operation is ignored, returning to the original process.

Thus, in the button mode, the panel strip 310 can be used as a button in the center button part 313. Note that in the button mode, when there is a long press operation, change of value is performed only at the time of the new touch.

On the other hand, when the mode of the panel strip 310 is the "increase/decrease mode" in step S51, the process proceeds to step S54, and when the operation detected this time is not an off operation (when it is a new touch operation or a continuous touch operation), the CPU 11 stores the current touch position (S55). Then, when the touch position thereof is different from the previous touch position (Yes in S56), the CPU 11 determines that the operation detected this time is an operation to slide a finger on the panel strip 310 (such as a flick operation or a drag operation), and increases or decreases, by one unit, the value of the parameter corresponding to the operated panel strip 310 according to the direction of movement compared to the previous touch (S57 to S59). This one unit may be a minimum adjustment unit of the value of the parameter. Further, when the operating mode is "coupling", the value of the temporary parameter is changed here.

The process of above steps S57 to S59 corresponds to operation when the panel strip 310 is used as one increase and decrease control which accepts the instruction of increasing or decreasing by an operation of sliding a finger.

After steps S58 or S59, the process proceeds to FIG. 13B, and when the currently set operating mode is "coupling" (Yes in S60), the CPU 11 converts the value of the temporary parameter after the change, with the conversion table (see FIG. 12) corresponding to the temporary parameter, into the value of a numerical parameter to be set in the FM tone generator circuit 22 (FB level in the example of FIG. 12) (S61). Moreover, when the value of the temporary parameter is changed to exceed the threshold at this time (Yes in S62), the CPU 11 inverts the value of the toggle parameter corresponding to the changed temporary parameter (presence of absolute value conversion in the example of FIG. 12) (S63), and the process of FIG. 13A and FIG. 13B is finished, returning to the original process.

When the judgment results in No in step S62, the CPU 11 returns to the original process without changing the value of the toggle parameter.

When the judgment results in No in step S60, the process after step S61 is not necessary, and thus the CPU 11 returns to the original process at this point.

Further, in step S56, when it is judged that the touch position is the same as that in the previous touch position, the CPU 11 performs process to consider an operation on a cursor part. Therefore, when the operation detected this time is not a touch on the upper cursor part 311 or the lower cursor part 312 (No in S64), no further consideration is necessary, and thus the CPU 11 returns to the original process at this point. When the touch at the position other than the cursor part is continued, this flow is taken, and the value of the parameter is not changed.

On the other hand, when it is Yes in step S64, the CPU 11 counts up a first touch time (S65). Then, when the count value of this counter reaches a predetermined update threshold (Yes in S66), tap and long press response process illustrated in FIG. 14 is executed (S67). When it is No in step S66, no further consideration is made at this point, and the CPU 11 returns to the original process.

Note that the update threshold used in step S66 has a meaning of a cycle of updating, when there is a continuous touch operation on a cursor part 311 or 312, the value of the parameter according to the touch operation, and also has a meaning of a threshold for removing a touch operation for a too short time as noise. Further, when the touch operation on the cursor part 311 or 312 continues, the count up in step S65 is made substantially in a cycle of the time interrupt in step S18 of FIG. 9. Considering these, the count value corresponding to a touch operation that continues for several tens of milliseconds for example may be taken as the update threshold.

Next, FIG. 14 illustrates a flowchart of tap and long press handling process executed in step S67 of FIG. 13.

In this process, the CPU 11 first increases or decreases, by one unit, the value of the parameter corresponding to the operated panel strip 310 corresponding to whether the touch operation detected this time is an operation on the upper cursor part 313 or an operation on the lower cursor part 312, similarly to the case of step S58 or S59 of FIG. 13 (S71 to S73).

The above process of step S71 to S73 corresponds to operation when the panel strip 310 is used as a combination of an increase control and a decrease control for accepting an instruction of increasing and decreasing by a tap operation.

Next, the CPU 11 resets the first touch time counter (S74), and counts up a second touch time counter (S75). Then, when the count value of the second touch time counter reaches a long pressing threshold (Yes in S76), the CPU 11 multiplies a change unit of the value of the parameter by N (S77), and returns to the original process.

Note that the second touch time counter is a counter for counting the update threshold of step S66 of FIG. 13 as a unit, and is counted up every time the first touch time counter reaches the update threshold. The determination in step S76 is to allow the value of the parameter to be changed at high speed when the cursor part is pressed long, and for example, a count value corresponding to a 0.6 second may be set as the long pressing threshold. Further, the first touch time counter is reset once for counting the timing to execute the tap and long press handling process of FIG. 14 next time.

The first touch time counter, the second touch time counter, and the change unit which is multiplied by n in step S77 are all reset (S68) when the continuous touch operation is finished and the judgment results in No in step S54 of FIG. 13. That is, the count value of the counter returns to zero, and the change unit returns to the value before the change.

Further, after the tap and long press handling process of FIG. 14, the process proceeds to step S60 of FIG. 13B, and the CPU 11 executes process of step S61 and so on when the operating mode is "coupling".

Further, when the parameter value change process of FIG. 13A and FIG. 13B is finished, the process proceeds to step S38 of FIG. 10, and the CPU 11 executes reflection process of FIG. 15.

FIG. 15 illustrates a flowchart of the reflection process.

This process is for reflecting, when the value of a parameter is changed by the immediately previous parameter value change process (Yes in S81), the change on the audio signal generation of the FM tone generator circuit 22 and display on the display 21.

When the judgment results in No in step S81, the CPU 11 finishes the process immediately because reflection is not necessary. On the other hand, when the judgment results in Yes, the CPU 11 sets the value of the parameter after the change to the FM tone generator circuit 22 (S82). Note that for the parameter whose operating mode is "coupling", one to be set is not the temporary parameter but the value of the numerical parameter after the conversion and the value of the toggle parameter corresponding to the temporary parameter.

Further, the CPU 11 updates display according to the display method of the changed parameter (S83 to S89), but here only process related to display according to the coupling indicator method will be explained in detail.

In the case of the coupling indicator method, the CPU 11 controls the display 302 to display the value of the numerical parameter after the conversion by an upward or downward bar in the coupling indicator 324 depending on whether the value of the temporary parameter after the change is equal to or more than a threshold (S85 to S87). That is, when the value of the numerical parameter is the same, the state of display may be different depending on the value of the temporary parameter.

Next, the CPU 11 controls the display 302 to display an icon indicating the value of the toggle parameter corresponding to the changed temporary parameter in the position corresponding to the value of the toggle parameter in the icon display part 323 (S88). The "corresponding position" mentioned here is a position indicating the direction in which the bar extends in the coupling indicator 324 when the toggle parameter takes the value indicated by the relevant icon. To explain in the example of FIG. 7, as for the icon 323a indicating a rectangular wave (absolute value conversion-on), the lower side of the origin of the coupling indicator 324 is the "corresponding position", and as for the icon 323b indicating a saw-tooth wave (absolute value conversion-off), the upper side of the origin is the "corresponding position".

The CPU 11 further controls the display to display the value of the numerical parameter after the conversion in the parameter value display part 322 (S89), and finishes the process in FIG. 15.

This concludes the explanation of the series of processing illustrated in the flowchart of FIG. 9.

By the processing as has been explained, the synthesizer 10 can set a type of an effect to be given to an audio signal which the tone generator unit generates, and degree of the effect given to the audio signal, according to an operation of one increase and decrease control or a combination of an increase control and a decrease control. At this time, the above setting is made so that, when an operation to further decrease the degree of the effect given to the audio signal to less than zero is detected, the type of the effect to be given to the audio signal is changed.

This enables to operate, with one control, two types of parameters, such as the FB level and the presence of absolute value conversion for which it is necessary to prepare two controls if they are adjusted separately. The values of parameters used by the tone generator unit to generate an audio signal can be set efficiently by using a small number of controls. That is, an operation with a good operability is realized with the area of the operation panel being suppressed.

Further, when the above method is applied to setting of items which has no influence on the audio signal even if the type of an effect to be given to the audio signal is changed when the degree of the effect given to the audio signal is zero, it gives no particular sense of discomfort to the user when the type of the effect is changed during a sequential increasing or decreasing operation, thereby achieving a natural sense of operation.

When the type of an effect to be set by the above method can be switched by on and off of particular processing in a generation algorithm of the audio signal in the tone generator unit, adjusted items can be grasped easily by the user as compared to the case where the type of the effect is changed to one which has no relation therewith during a sequential increasing or decreasing operation, thereby achieving a natural sense of operation.

In the case of the FM tone generator unit, feedback control of a read address when an audio signal is read from the memory can give a large influence on the timbre. Therefore, when the above method is applied to processing included in this feedback control, the user can obtain a variety of timbres which vary widely by operating one increase and decrease control or a combination of an increase control and a decrease control, which is preferable.

Further, it is uneasy, not only in the FM tone generator but generally, to comprehend the relation between values of parameters used for generation of an audio signal, particularly values of parameters which define timbre, and the actually outputted sound. Therefore, when a variety of timbers can be listened and compared one another by such a simple operation, it is conceivable that its convenience in the field of musical expression is quite high.

As the process included in the feedback control, for example, absolute value conversion processing by the absolute value conversion part 206 illustrated in FIG. 4 is conceivable, which is performed on the value of an audio signal generated by the tone generator unit, which should be added to the read address in feedback control of the read address.

Further, regarding a specific operation, a change in the degree of the effect given to the audio signal according to an operation of the increase and decrease control is such that, as illustrated in FIG. 12, the increasing or decreasing operation with the increase and decrease control and the direction of increase or decrease of the above degree are matched while a first type (absolute value conversion-off in the example of FIG. 12) is set as the type of the effect to be given to the audio signal, on the other hand the increasing or decreasing operation with the increase and decrease control and the direction of increase or decrease of the above degree are opposite while a second type (absolute value conversion-on in the example of FIG. 12) is set. Thus, a sequential increasing and decreasing operation across a change in the type of the effect can be performed with a natural sense of operation.

Further, regarding display, in the above-described embodiment, the coupling indicator 324 illustrated in FIG. 7 displays the set type of an effect and the degree of the effect of this type by the coupling indicators having a continuous numerical axis and including a first indicator of the degree of an effect of a first type in the case where the effect of the first type is set and a second indicator of the degree of an effect of a second type in the case where the effect of the second type is set. By such display, the type of an effect and the degree thereof can be displayed in a form such that the indicated position on the indicator moves one-dimensionally as the increasing or decreasing operation can be performed, thereby achieving comprehensible display.

Moreover, in the above-described embodiment, as illustrated in FIG. 7 and FIG. 8, the panel strip 310 which is a touch panel for accepting a one-dimensional operation, corresponding to each of the plurality of operators 200 provided in the FM tone generator circuit 22, is provided in an array in a direction (horizontal direction in the diagrams) different from the operating direction (vertical direction in the diagrams). This allows arraying a large number of increase and decrease controls in a narrow area. Further, the touch panel for accepting a one-dimensional operation is of low cost, and is preferred to applications accepting an increasing and decreasing operation.

Further, in the above-described embodiment, the panel strip 310 is configured such that operations on at least the both end parts and the center part of the strip-shaped control part can be separately detected. Further, by the switching of modes explained using FIG. 10 and FIG. 11, the CPU 11 functions as a sensor controller, and can selectively perform one of control in a first mode (increase/decrease mode) of using the panel strip 310 as an increase and decrease control by disabling detection of operation on the center part while enabling detection of operation on the both end parts, and control in a second mode (button mode) of using the panel strip 310 as a button control by enabling detection of operation on the center part while disabling detection of operation on the both end parts. By allowing one strip-shaped control part to selectively achieve a plurality of functions in this manner, the number of physical controls to be disposed on the control panel can be decreased, and the area of the control panel can also be decreased accompanying this.

This concludes the explanation of the embodiment. It is needless to mention that the configuration of the apparatus, the generation method of the audio signal in the tone generator unit, the specific procedures of processing, the configurations of controls, the operating method, and the types of parameters handled are not limited to those explained in the above-described embodiment.

For example, in the above-described embodiment, although the plurality of panel strips 310 are used as controls corresponding to respective operators 200 in the FM tone generator, it is also conceivable to use them as controls corresponding to a plurality of items of parameters defining one timbre in a PCM (Pulse Code Modulation) tone generator which generates an audio signal by a frequency modulation method. The point that one panel strip 310 is used for setting type of an effect to be given to the audio signal and the degree of the effect is the same as the above-described embodiment.

FIG. 16 illustrates an example of an operation panel corresponding to FIG. 7 in this case. In FIG. 16, components corresponding to those in FIG. 7 are indicated by the same numerals as those in FIG. 7.

In the example of FIG. 16, for simplicity of explanation, the number of panel strips 310 is two. With these panel strips 310, type of LFO (Low Frequency Oscillator) processing to be performed on an audio signal in the PCM tone generator and degree thereof can be set.

In the example of FIG. 16, in a timbre name display part 326, the name "V31" of timbre which is stored in advance and currently read is displayed. This timbre is of, for example, a bamboo flute.

Then, in a panel strip 310a on the left, the waveform of the LFO to be used for frequency modulation can be set. More specifically, while switching the waveform used for LFO processing, as type of an effect to be given to the audio signal, between a saw-tooth wave (upper side in the diagram) and a sinusoidal wave (lower side in the diagram), a depth of LFO processing can be set as degree of the effect to be given to the audio signal.

In a panel strip 310b on the right, the waveform of LFO to be used for level modulation can be similarly set.

In both cases, when the "numerical parameter" in FIG. 12 to FIG. 13B, and so on of the above-described embodiment is the depth of LFO processing and the "toggle parameter" is the waveform of LFO, it is possible to set values of parameters according to an operation of the increase and decrease control by processing similar to the above-described embodiment.

Further, it can be similarly considered that depth of vibrato processing and waveform used for the vibrato processing can be set using one panel strip 310.

Moreover, it is also conceivable that while type of an effect to be given to the audio signal is switched between a tremolo (pitch oscillation) and a chorus (pitch shift), magnitude of oscillation or shift of pitch thereof can be set as degree of the effect to be given to the audio signal.

When type of waveform characteristics to be modulated can be switched in this manner, the user can obtain a variety of timbres which vary widely by operating one increase and decrease control or a combination of an increase control and a decrease control, which is preferable.

Further, in the above-described embodiment, the example in which all of the plurality of panel strips 310 are operated in the same mode was explained, but this is not restrictive. The panel strips 310 may be configured so that each of them can operate in a different mode depending on the selection of a parameter to be the operating target.

FIG. 17 illustrate examples of an operation panel corresponding to FIG. 16 in this case.

In the example of FIG. 17, setting of the same item as in the case of FIG. 16 is accepted, but the panel strip 310b on the right is used in a button mode in the example of FIG. 17. Then, by operating the center button part 313 in the vicinity of the button mark 313a, the type of the parameter to be set with the panel strip 310a on the left in the increase/decrease mode can be switched. That is, whether to set the waveform of LFO to be used for frequency modulation or set the waveform of LFO to be used for level modulation by the panel strip 310a on the left can be switched by toggling using the center button part 313 of the panel strip 310b on the right.

In FIG. 17, (a) illustrates a state of the former, and (b) illustrates a state of the latter. On the display 302, in an item display part 360 corresponding to the panel strip 310b, the current selection state is displayed by icons 361, 362. The icon of solid line indicates the currently selected state.

Further, besides the above, the touch sensor used for the invention is not limited to one accepting a one-dimensional operation only. For example, the detection area of a touch sensor which accepts a two-dimensional operation can be partitioned, so as to use them as a plurality of touch sensors which accept a one-dimensional operation only.

Moreover, a touch sensor which accepts a two-dimensional operation may be configured to function as a plurality of increase and decrease controls such that each one operating direction corresponds to one of the increase and decrease controls.

FIG. 18 illustrates an example of this.

In the example of FIG. 18, on a touch panel 350 which accepts a two-dimensional operation, an operation in an X direction and an operation in a Y direction are accepted as operations on mutually different (virtual) increase and decrease controls. Regarding an operation to slide a finger, directions of the operation can be detected separately in the X direction and the Y direction, it is possible to comprehend the amount of operation on each increase and decrease control. Further, an upper cursor part 351 and a lower cursor part 352 are provided on both end parts in the Y direction, a left cursor part 353 and a right cursor part 354 are provided on both end parts in the X direction, and they can be used as a combination of an increase control and a decrease control similarly to the case of the cursor parts in the panel strip 310.

Further, besides the above, without providing the touch sensor and the display separately, an area of one touch display 500 is divided, and a part thereof may be used as a panel strip 510 and another part may be used as a display 520, as illustrated in FIG. 19.

Alternatively, without using the touch sensor, the combination of the increase control and the decrease control may be a combination of physical buttons or keys, or the like. Further alternatively, the increase and decrease control may be one slider or knob, or a rotary encoder. Moreover, the above control may be provided with a driver such as a motor so that the CPU 11 can move an operating portion of the control to an arbitrary position by controlling the driver.

FIG. 20A illustrates an example of the increase and decrease control configured as a physical slider.

A slider 530 illustrated in FIG. 20A is a control provided with a knob 531. A user can control both of type (toggle parameter) of an effect to be given to the audio signal and degree (numerical parameter) of the effect of the type to be given to the audio signal, by moving the knob 531 upward and downward in the figure. From an analogy with a conventional fader, the upward operation can be considered as an increasing operation, and the downward operation can be considered as a decreasing operation.

The CPU 11 detects the position of the knob 531. While the knob 531 is above the mark of "first type" in the scale, the CPU 11 sets the first type as the type of the effect to be given to the audio signal, and the more the knob 531 is moved upward, the more the CPU 11 increases the degree of the effect to be given. Conversely, While the knob 531 is below the mark of "second type", the CPU 11 sets the second type as the type of the effect to be given to the audio signal, and the more the knob 531 is moved downward, the more the CPU 11 increases the degree of the effect to be given. Scale marking numerals indicates relative values of the degree of the numerical parameter.

An operation to move the knob 531 from the mark of "first type" to the mark of "second type", and the inverse operation are operations to change the type of the effect to be given to the audio signal. The value of the numerical parameter is not preferably changed while the knob 531 moves between the mark of "first type" and the mark of "second type". Even if it takes a certain time to execute a processing to change the type of the effect, the processing can be executed while the knob 531 moves between the mark of "first type" and the mark of "second type". Accordingly, the CPU 11 can change the type of the effect while the user are not aware of the certain time.

The above slider 530 can display, by the position of the knob 531, the type of the effect to be given to the audio signal and the degree of the effect. Accordingly, it can be said that the slider 530 has functions of both the increase and decrease control and the coupling indicator.

Note that it is not necessary that the scale of the slider has upper and lower symmetry. The scale may be asymmetric like the slider 540 illustrated in FIG. 20B, in which, among the movable range of a knob 541, a length above the mark of "first type" and a length below the mark of "second type" are different from each other.

For example, the slider can be configured such that the "first type" corresponds to a monophonic mode (MONO) and the "second type" corresponds to a polyphonic mode (POLY). Further, it is also conceivable that, for example, a portamento speed parameter in the monophonic mode can be controlled using the movable range corresponding to the "first type". The portament speed parameter is a parameter indicating changing speed of pitch in a protamento function for, when one note is sounded and then another note is sounded, smoothly and gradually changing pitch of the sound between the sounded notes.

Further, the above sliders may be configured such that a slight friction is provided when the user moves the knob between the mark of "first type" and the mark of "second type", or further a click sound is provided then. This enables the user to be clearly aware of the change of the type of the effect. Further, the friction increases time spent on movement between the mark of "first type" and the mark of "second type", and thus longer time can be permitted to change the type of the effect.

FIG. 20C illustrates an example of configuration for providing the friction and the click sound. FIG. 20C is a schematic sectional view of a movable portion of a slider 550 provided inside the operation panel 300.

The slider 550 includes a housing 551, shaft 552 and a movable body 553. The shaft 552 is fixed on the housing 551, and the movable body moves along the shaft 552. A member like a knob 531 in FIG. 20A which the user operates to move the movable member 553 is fixed on the movable member 553. Further, a protruding member 555 is fixed on the movable member via a spring 554 which is an elastic member.

Further, slits 556 are formed on one side of the housing 551. The protruding member 555 is pressed onto a side wall of the housing 551 and the spring 554 is contracted while the protruding member 555 is not at positions of the slits 556. When the protruding member 555 comes to the position of one of the slits 556, the spring 554 is released and the protruding member 555 protrudes into the slit 556. Then when the protruding member 555 passes the position of the slit 556, the protruding member 555 is pressed onto the side wall of the housing 551 again.

The protruding member 555 and the slits 556 are an obstacle provided on the path of the movable member 553 for providing the friction and the click sound on movement of the movable member 553 at the position of the slit 556. Other obstacles having different structure can be adopted to provide the friction and the click sound.

It is conceivable to provide the slits 556 at positions corresponding to the mark of "first type" and the mark of "second type", respectively. It is also conceivable to provide the slits 556 at other positions such that the degree of the effect can be changed step by step while providing a click sound for each step.

FIG. 21 illustrates another example of the increase and decrease control configured as a physical rotary knob.

A rotary knob 560 illustrated in FIG. 21 is a control. A user can control both of type (toggle parameter) of an effect to be given to the audio signal and degree (numerical parameter) of the effect of the type to be given to the audio signal, by rotating (rotationally moving) the knob 560. For example, the clockwise operation can be considered as an increasing operation, and the counterclockwise operation can be considered as a decreasing operation.

The arrow in the figure indicates the position of the knob 560. The CPU 11 sets the first type as the type of the effect to be given to the audio signal while the knob 560 is in a plus side in the right half area in the figure. The CPU 11 sets the second type while the knob 560 is in a minus side in the left half area in the figure. Scale marking numerals indicates relative values of the degree of the numerical parameter similarly to the case of FIG. 20A.

Further, in the above-described embodiment, the value of a parameter to be actually set in the tone generator unit is obtained using the temporary parameter and the conversion table, but such a configuration is not required. For example, it is conceivable that the value of the numerical parameter to be set in the tone generator unit is directly increased or decreased according to an operation of the increase and decrease control, and when an operation to further decrease the value of the numerical parameter to less than zero is detected, the value of the toggle parameter is changed, and the relation between the operation of the increase and decrease control and increase or decrease of the value of the numerical parameter is reversed.

Further, configuring the parameter controller of the invention as an electronic musical instrument such as a synthesizer is not required. The parameter controller may be configured as a tone generator apparatus which has no performance control and generates an audio signal according to performance data inputted from the outside. Further, the invention may be configured as a remote controller for performing operation or control from the outside on an apparatus having a tone generator unit.

Besides the above, it is also conceivable that the function related to control of parameters in the synthesizer 10 is distributed in a plurality of devices, and these devices are configured to cooperate one another, thereby constituting a system having a parameter control function similar to that in the synthesizer 10 as has been described.

Further, the configurations and the modification examples as have been described above can also be applied in an appropriate combination within the range not contradicting each other. Conversely, the various configurations and functions as have been described need not all be provided together but may be provided individually.

INDUSTRIAL APPLICABILITY

As is clear from the explanation above, according to the invention, a parameter controller can be provided with which values of parameters used by a tone generator unit to generate an audio signal can be set efficiently by using a limited number of controls.

REFERENCE SIGNS LIST

10 . . . synthesizer, 11 . . . CPU, 12 . . . ROM, 13 . . . RAM, 14 . . . MIDI I/F, 15 . . . communication I/F, 16, 17 . . . detection circuit, 18 . . . display circuit, 19 . . . performance control, 20 . . . setting control, 21 . . . display, 22 . . . FM tone generator circuit, 23 . . . DA converter, 24 . . . speaker, 25 . . . system bus, 200-1 to 200-4 . . . operator (OP), 201 . . . phase generator, 202 . . . adder, 203 . . . basic waveform memory, 204, 208 . . . multiplier, 205 . . . envelope generator (EG), 206 . . . absolute value conversion part, 207 . . . switch part, 300 . . . operation panel, 301 . . . touch panel part, 302, 520 . . . display, 303 . . . button group, 310, 310a, 310b, 510 . . . panel strip, 311, 351 . . . upper cursor part, 311a . . . upper cursor mark, 312, 352 . . . lower cursor part, 312a . . . lower cursor mark, 313 . . . center button part, 313a . . . button mark, 321 . . . operator connection display part, 322 . . . parameter value display part, 323 . . . icon display part, 323a, 323b, 361, 362 . . . icon, 324 . . . coupling indicator, 325 . . . on/off display part, 326 . . . timbre name display part, 350 . . . touch panel, 353 . . . left cursor part, 354 . . . right cursor part, 360 . . . item display part, 500 . . . touch display, 530, 540, 550 . . . slider, 531, 541 . . . knob, 551 . . . housing, 552 . . . shaft, 553 . . . moving member, 554 . . . spring, 555 . . . protruding member, 556 . . . slit, X, Y . . . operating direction.

The invention claimed is:

1. A parameter controller configured to control a parameter used by a tone generator unit to generate an audio signal, the parameter controller comprising:
a manual control device; and
a controller configured to:
set, according to an operation of the manual control device of one increase and decrease control or one combination of an increase control and a decrease control, a first effect or a second effect that is different from the first effect, and a degree of effect thereof to be given to the audio signal depending on a position of the manual control device; and
change, when the controller detects an operation of the manual control device to further decrease the degree of effect of the first effect to be given to the audio signal to less than zero, from the first effect to the second effect to be given to the audio signal.

2. The parameter controller according to claim 1, wherein:
the tone generator unit comprises a frequency modulation circuit that generates the audio signal by frequency modulation, and
the effect to be given to the audio signal set by the controller according to the operation is switched between the first effect and the second effect based on whether a particular processing in a generation algorithm of the audio signal in the tone generator unit is turned on or off.

3. The parameter controller according to claim 2, wherein the particular processing is processing in feedback control of a read address in reading of an audio signal from a memory.

4. The parameter controller according to claim 3, wherein the particular processing is absolute value conversion processing performed on a value of the audio signal generated by the tone generator unit, and the value is to be added to the read address in the feedback control of the read address.

5. The parameter controller according to claim 1, wherein the effect to be given to the audio signal set by the controller according to the operation is switched between the first effect and the second effect by changing a kind of a waveform characteristic to be modulated by the degree set by the controller in the generation algorithm of the audio signal in the tone generator unit.

6. The parameter controller according to claim 1, further comprising:
a display controller configured to control displaying on an internal or external display, the display controller being configured to control the display to display, on the display, a type of the effect and the degree of effect set by the controller, with a coupling indicator comprising:
a continuous numerical axis;
a first indicator of the degree of effect of the first effect to be given when the controller sets the first effect; and
a second indicator of the degree of effect of the second effect to be given when the controller sets the second effect.

7. The parameter controller according to claim 1, wherein:
the tone generator unit comprises a frequency modulation circuit that generates the audio signal by frequency modulation with a plurality of operators, the one increase and decrease control or the one combination of the increase control and the decrease control corresponding to each of the operators are provided as touch panels that accept a one-dimensional operation, and the touch panels are arrayed in a direction different from an operating direction of the touch panels, and
according to an operation of the one increase and decrease control or the one combination of the increase control and the decrease control corresponding to any of the operators, the controller sets the effect to be given to the audio signal generated by the any of the operators and the degree of effect to be given to the audio signal generated by the any of the operators.

8. The parameter controller according to claim 1, further comprising:

a touch sensor configured to separately detect operations on at least both end parts and a center part of a strip-shaped control part; and a sensor controller configured to selectively perform one of control in a first mode of using the touch sensor as the one increase and decrease control or the one combination of the increase control and the decrease control by disabling the detection of operation on the center part while enabling the detection of operation on the both end parts of the touch sensor, or control in a second mode of using the touch sensor as a button control for accepting an operation on a predetermined parameter used by the tone generator unit to generate an audio signal, by enabling the detection of operation on the center part while disabling the detection of operation on the both end parts of the touch sensor.

9. The parameter controller according to claim 1, wherein:
the manual control device comprises a movable operating portion configured to accept an operation by a user for the one increase and decrease control, and
the movable operating portion moves along a continuous numerical axis comprising a first scale indicating the degree of effect of the first effect to be given and a second scale indicating the degree of effect of the second effect to be given, set by the controller by a position of the movable operating portion along the numerical axis.

10. The parameter controller according to claim 9, further comprising an obstacle configured to provide a friction on movement of the movable operating portion at a position to set the degree of effect to be given to the audio signal at zero.

11. A method of controlling a parameter used by a tone generator unit to generate an audio signal, the method comprising the steps of:
setting, according to an operation of one increase and decrease control or one combination of an increase control and a decrease control, a type of effect to be given to the audio signal and a degree of effect of the type to be given to the audio signal; and
changing the type of effect to be given to the audio signal when an operation to further decrease the degree of effect to be given to the audio signal to less than zero is detected,
wherein while a first type is set as the type of the effect to be given to the audio signal, the setting step increases the degree of effect to be given according to an increasing operation on the one increase and decrease control or the one combination of the increase control and the decrease control, and decreases the degree of effect to be given according to a decreasing operation on the one increase and decrease control or the one combination of the increase control and the decrease control, and the changing step changes the type of effect to be given to the audio signal to a second type when a decreasing operation to further decrease the degree of effect to less than zero is detected, and
wherein while the second type is set as the type of effect to be given to the audio signal, the setting step increases the degree of effect to be given according to a decreasing operation on the one increase and decrease control or the one combination of the increase control and the decrease control, and decreases the degree of effect to be given according to an increasing operation on the one increase and decrease control or the one combination of the increase control and the decrease control, and the changing step changes the type of effect to be given to the audio signal to the first type when an increasing operation to further decrease the degree of effect to less than zero is detected.

12. The method according to claim 11, further comprising the step of:
controlling displaying on an internal or external display so that the type of effect and the degree of effect set in the setting step are displayed on the display by a coupling indicator comprising:
a continuous numerical axis;
a first indicator of the degree of effect of the first type to be given when the effect of the first type is set; and
a second indicator of the degree of effect of the second type to be given when the effect of the second type is set.

13. The method according to claim 11, wherein:
the tone generator unit comprises a frequency modulation circuit that generates the audio signal by frequency modulation with a plurality of operators, the one increase and decrease control or the one combination of the increase control and the decrease control corresponding to each of the operators are provided as touch panels that accept a one-dimensional operation, and the touch panels are arrayed in a direction different from an operating direction of the touch panels, and
the setting step, according to an operation of the one increase and decrease control or the one combination of the increase control and the decrease control corresponding to any of the operators, sets the type of effect to be given to the audio signal generated by the any of the operators and the degree of effect to be given to the audio signal generated by the any of the operators.

14. The method according to claim 11, further comprising the step of:
controlling a touch sensor configured to separately detect operations on at least both end parts and a center part of a strip-shaped control part,
wherein the controlling step includes a first mode controlling of using the touch sensor as the one increase and decrease control or the one combination of the increase control and the decrease control by disabling the detection of operation on the center part while enabling the detection of operation on the both end parts of the touch sensor, and a second mode controlling of using the touch sensor as a button control for accepting an operation on a predetermined parameter used by the tone generator unit to generate an audio signal, by enabling the detection of operation on the center part while disabling the detection of operation on the both end parts of the touch sensor, one of the first mode controlling or the second mode controlling being selectively performed.

15. The method according to claim 11, further comprising the step of displaying the type of effect and the degree of effect set in the setting step, by a position of a movable operating portion of the one increase and decrease control, the movable operating portion moving along a continuous numerical axis comprising a first scale indicating the degree of effect of the first type to be given and a second scale indicating the degree of effect of the second type to be given.

16. The method according to claim 15, wherein the one increase and decrease control comprises an obstacle configured to provide a friction on movement of the movable operating portion at a position to set the degree of effect to be given to the audio signal at zero.

17. A parameter controller configured to control a parameter used by a tone generator unit to generate an audio signal, the parameter controller comprising:

a controller configured to set, according to an operation of one increase and decrease control or one combination of an increase control and a decrease control, a type of effect to be given to the audio signal and a degree of effect of the type to be given to the audio signal, wherein the controller is configured to change, when the controller detects an operation to further decrease the degree of effect to be given to the audio signal to less than zero, the type of effect to be given to the audio signal, wherein while a first type is set as the type of effect to be given to the audio signal, the controller increases the degree of effect to be given according to an increasing operation on the one increase and decrease control or the one combination of the increase control and the decrease control, and decreases the degree of effect to be given according to a decreasing operation on the one increase and decrease control or the one combination of the increase control and the decrease control, and when a decreasing operation to further decrease the degree of effect to less than zero is detected, changes the type of effect to be given to the audio signal to a second type, and wherein while the second type is set as the type of effect to be given to the audio signal, the controller increases the degree of effect to be given according to a decreasing operation on the one increase and decrease control or the one combination of the increase control and the decrease control, decreases the degree of effect to be given according to an increasing operation on the one increase and decrease control or the one combination of the increase control and the decrease control, and when an increasing operation to further decrease the degree of effect to less than zero is detected, changes the type of effect to be given to the audio signal to the first type.

18. The parameter controller according to claim 17, wherein:

the tone generator unit comprises a frequency modulation circuit that generates the audio signal by frequency modulation, and the type of effect to be given to the audio signal set by the controller according to the operation is switched between the first type and the second type based on whether a particular processing in a generation algorithm of the audio signal in the tone generator unit is turned on or off.

19. The parameter controller according to claim 18, wherein the particular processing is processing in feedback control of a read address in reading of an audio signal from a memory.

20. The parameter controller according to claim 19, wherein the particular processing is absolute value conversion processing performed on a value of the audio signal generated by the tone generator unit, and the value is to be added to the read address in the feedback control of the read address.

21. The parameter controller according to claim 17, wherein the type of effect to be given to the audio signal set by the controller according to the operation is switched between the first type and the second type by changing a kind of a waveform characteristic to be modulated by the degree set by the controller in the generation algorithm of the audio signal in the tone generator unit.

22. The parameter controller according to claim 17, further comprising:

a display controller configured to control displaying on an internal or external display, the display controller being configured to control the display to display, on the display, the type of effect and the degree of effect set by the controller by a coupling indicator comprising:

a continuous numerical axis;

a first indicator of the degree of effect of the first type to be given when the controller sets the effect of the first type; and a second indicator of the degree of effect of the second type to be given when the controller sets the effect of the second type.

23. The parameter controller according to claim 17, wherein:

the tone generator unit comprises a frequency modulation circuit that generates the audio signal by frequency modulation with a plurality of operators, the one increase and decrease control or the one combination of the increase control and the decrease control corresponding to each of the operators are provided as touch panels that accept a one-dimensional operation, and the touch panels are arrayed in a direction different from an operating direction of the touch panels, and according to an operation of the one increase and decrease control or the one combination of the increase control and the decrease control corresponding to any of the operators, the controller sets the type of effect to be given to the audio signal generated by the any of the operators and the degree of effect to be given to the audio signal generated by the any of the operators.

24. The parameter controller according to claim 17, further comprising:

a touch sensor configured to separately detect operations on at least both end parts and a center part of a strip-shaped control part; and a sensor controller configured to selectively perform one of control in a first mode of using the touch sensor as the one increase and decrease control or the one combination of the increase control and the decrease control by disabling the detection of operation on the center part while enabling the detection of operation on the both end parts of the touch sensor, or control in a second mode of using the touch sensor as a button control for accepting an operation on a predetermined parameter used by the tone generator unit to generate an audio signal, by enabling the detection of operation on the center part while disabling the detection of operation on the both end parts of the touch sensor.

25. The parameter controller according to claim 17, further comprising:

a movable operating portion configured to accept an operation by a user for the one increase and decrease control, wherein the movable operating portion moves along a continuous numerical axis comprising a first scale indicating the degree of effect of the first type to be given and a second scale indicating the degree of effect of the second type to be given, set by the controller by a position of the movable operating portion along the numerical axis.

26. The parameter controller according to claim 25, further comprising an obstacle configured to provide a friction on movement of the movable operating portion at a position to set the degree of effect to be given to the audio signal at zero.

27. A method of controlling a parameter used by a tone generator unit to generate an audio signal, the method comprising the steps of:

providing a manual control device;

setting, according to an operation of the manual control device of one increase and decrease control or one combination of an increase control and a decrease control, a first effect or a second effect that is different from the first effect, and a degree of effect thereof to be given to the audio signal depending on a position of the manual control device; and changing, when the controller detects an operation of the manual control device to further decrease the degree of effect of the first effect to be given to the audio signal to less than zero, from the first effect to the second effect to be given to the audio signal.

28. The method according to claim 27, further comprising the step of:

controlling displaying on an internal or external display so that the effect and the degree of effect set in the setting step are displayed on the display, with a coupling indicator comprising:

a continuous numerical axis;

a first indicator of the degree of effect of the first effect to be given when the first effect is set; and a second indicator of the degree of effect of the second effect to be given when the second effect is set.

29. The method according to claim 27, wherein:

the tone generator unit comprises a frequency modulation circuit that generates the audio signal by frequency modulation with a plurality of operators, the one increase and decrease control or the one combination of the increase control and the decrease control corresponding to each of the operators are provided as touch panels that accept a one-dimensional operation, and the touch panels are arrayed in a direction different from an operating direction of the touch panels, and the setting step, according to an operation of the one increase and decrease control or the one combination of the increase control and the decrease control corresponding to any of the operators, sets the effect to be given to the audio signal generated by the any of the operators and the degree of effect to be given to the audio signal generated by the any of the operators.

30. The method according to claim 27, further comprising the step of:

controlling a touch sensor configured to separately detect operations on at least both end parts and a center part of a strip-shaped control part, wherein the controlling step includes a first mode controlling of using the touch sensor as the one increase and decrease control or the one combination of the increase control and the decrease control by disabling the detection of operation on the center part while enabling the detection of operation on the both end parts of the touch sensor, and a second mode controlling of using the touch sensor as a button control for accepting an operation on a predetermined parameter used by the tone generator unit to generate an audio signal, by enabling the detection of operation on the center part while disabling the detection of operation on the both end parts of the touch sensor, one of the first mode controlling or the second mode controlling being selectively performed.

31. The method according to claim 27, further comprising the step of displaying the degree of effect and the first or second effect set in the setting step, by a position of a movable operating portion of the one increase and decrease control, the movable operating portion moving along a continuous numerical axis comprising a first scale indicating the degree of effect of the first effect to be given and a second scale indicating the degree of effect of the second effect to be given.

32. The method according to claim 31, wherein the one increase and decrease control comprises an obstacle configured to provide a friction on movement of the movable operating portion at a position to set the degree of effect to be given to the audio signal at zero.

* * * * *

UNITED STATES PATENT AND TRADEMARK OFFICE
CERTIFICATE OF CORRECTION

PATENT NO. : 9,805,701 B2  
APPLICATION NO. : 15/196567  
DATED : October 31, 2017  
INVENTOR(S) : Yuji Yamada, Koichi Kashiwazaki and Satoshi Morita Page 1 of 1

It is certified that error appears in the above-identified patent and that said Letters Patent is hereby corrected as shown below:

On the Title Page

In Item (72) Inventors:
At the second line after Kashiwazaki, delete "Hamamatsau" and insert --Hamamatsu (JP)--

Signed and Sealed this
Twelfth Day of March, 2019

Andrei Iancu
*Director of the United States Patent and Trademark Office*